United States Patent
Tanaka et al.

(10) Patent No.: US 11,982,048 B2
(45) Date of Patent: May 14, 2024

(54) WATER-REPELLENT COMPOSITION

(71) Applicant: DAIKIN INDUSTRIES, LTD., Osaka (JP)

(72) Inventors: Yoshito Tanaka, Osaka (JP); Rena Inamasu, Osaka (JP); Yuko Shiotani, Osaka (JP); Shouta Shibutani, Osaka (JP); Masahiro Higashi, Osaka (JP); Tomohiro Yoshida, Osaka (JP); Norimasa Uesugi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 515 days.

(21) Appl. No.: 17/359,065

(22) Filed: Jun. 25, 2021

(65) Prior Publication Data

US 2022/0064851 A1   Mar. 3, 2022

Related U.S. Application Data

(63) Continuation of application No. PCT/JP2019/050154, filed on Dec. 20, 2019.

(30) Foreign Application Priority Data

Dec. 28, 2018 (JP) ................. 2018-248130

(51) Int. Cl.
*D06M 15/263* (2006.01)
*D06B 1/04* (2006.01)
*D06M 101/32* (2006.01)

(52) U.S. Cl.
CPC .......... *D06M 15/263* (2013.01); *D06B 1/04* (2013.01); *D06M 2101/32* (2013.01); *D06M 2200/12* (2013.01)

(58) Field of Classification Search
CPC .......... D06M 15/263; D06M 2101/32; D06M 2200/12; D06M 23/10; D06M 23/08; D06M 11/45; D06M 11/79; D06M 15/285; D06M 15/564; D06B 1/04; C08F 120/14; C08F 120/18; C08F 120/36; C08K 9/06; C09K 3/18; D10B 2401/021
See application file for complete search history.

(56) References Cited

FOREIGN PATENT DOCUMENTS

| | | | |
|---|---|---|---|
| CN | 105765025 A | | 7/2016 |
| JP | 2017-206775 A | | 11/2017 |
| JP | 2017206775 A | * | 11/2017 |
| JP | 2018-104866 A | | 7/2018 |
| JP | 2018-184692 A | | 11/2018 |

OTHER PUBLICATIONS

English Translation of JP2017206775 (Year: 2017).*
International Preliminary Report on Patentability with translation of Written Opinion dated Jun. 16, 2021, in International Application No. PCT/JP2019/050154.
International Search Report for PCT/JP2019/050154 dated Mar. 24, 2020.
Extended European Search Report dated Sep. 6, 2022 in counterpart European Application No. 19905610.2.

* cited by examiner

*Primary Examiner* — Andrew J. Oyer
(74) *Attorney, Agent, or Firm* — Sughrue Mion, PLLC

(57) ABSTRACT

A water repellent composition containing: (A) water repellent particles in which the number of surface alkyl groups on the water repellent particles is $600 \times 10^{18}$-$50,000 \times 10^{18}$ per 1 g of water repellent particles; (B) a water-repellent resin which is a polymer having a long-chain $C_{7-40}$ hydrocarbon group; and (C) a liquid medium. The water-repellent particles preferably have an average primary particle size of 1-100 nm. Also disclosed is a method for treating a fiber using the water repellent composition, a method for producing a treated textile product, a film formed from the water repellent composition, and a textile product treated with a treatment liquid containing the water-repellent composition.

19 Claims, No Drawings

WATER-REPELLENT COMPOSITION

CROSS REFERENCE TO RELATED APPLICATIONS

This application is a Rule 53(b) Continuation application under of PCT/JP2019/050154 filed Dec. 20, 2019, which claims priority from Japanese Patent Application No. 2018-248130, filed on Dec. 28, 2018. The above-noted applications are incorporated herein by reference in their respective entireties.

TECHNICAL FIELD

The present disclosure relates to a water-repellent composition.

BACKGROUND ART

A fluorine-containing water- and oil-repellent agent comprising a fluorine compound has conventionally been known. This water- and oil-repellent agent exhibits good water- and oil-repellency when a substrate such as a textile product is treated.

Concerns about the environmental impact of PFOA (perfluorooctanoic acid), which is a type of long-chain fluoroalkyl compound, have become apparent from recent research results [EPA report "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] and the like, and EPA (US Environmental Protection Agency) announced on Apr. 14, 2003 that it would strengthen its scientific research on PFOA.

On the other hand, Federal Register (FR Vol. 68, No. 73/Apr. 16, 2003 [FRL-2303-8], http://www.epa.gov/opptintr/pfoa/pfoafr.pdf), EPA Environmental News FOR RELEASE: MONDAY Apr. 14, 2003 EPA INTENSIFIES SCIENTIFIC INVESTIGATION OF A CHEMICAL PROCESSING AID (http://www.epa.gov/opptintr/pfoa/pfoaprs.pdf), and EPA OPPT FACT SHEET Apr. 14, 2003 (http://www. epa.gov/opptintr/pfoa/pfoafacts.pdf) state that telomers may degrade or metabolize to produce PFOA (the telomers mean long-chain fluoroalkyl groups). In addition, they also state that telomers are used in many products such as firefighting foams, care products, cleaning products, carpets, textiles, paper, and leather to which water- and oil-repellency and an antifouling property are imparted. It is concerned that fluorine-containing compounds may accumulate in the environment.

A water-repellent composition which does not comprise fluorine is being sought.

Patent Literature 1 (JP 2018-104866 A) discloses a water-repellent composition comprising (I) silica modified with a hydrophilizing agent and a hydrophobizing agent, and (II) a resin.

Patent Literature 2 (JP 2017-206775 A) discloses an aqueous dispersion for water-repellent finishing of a textile product, which comprises a hydrophobic inorganic fine particle as a seam slippage prevention component and a polymer as a water-repellent component.

The fluorine-free water-repellent agents disclosed in Patent Literature 1 and Patent Literature 2 score 100 points in evaluation using a spray method (spray water-repellency) in JIS L 1092. However, the fluorine-free water-repellent agents are greatly inferior, in terms of the slidability and the sliding speed of a water droplet, to the fluorine-containing water-repellent agent. In the present specification, the slidability and the sliding speed of a water droplet are collectively referred to as "strong water-repellency."

CITATION LIST

Patent Literature

Patent Literature 1: JP 2018-104866 A
Patent Literature 2: JP 2017-206775 A

SUMMARY OF INVENTION

Technical Problem

The present disclosure provides a water-repellent composition which can impart excellent water-repellency to a substrate.

Solution to Problem

The present disclosure relates to a water-repellent composition comprising:
(A) a water-repellent particle; and
(B) a water-repellent resin.
Preferable aspects of the present disclosure are as follows.
A water-repellent composition comprising:
(A) a water-repellent particle in which the number of surface alkyl groups of the water-repellent particle is $600 \times 10^{18}$ to $50,000 \times 10^{18}$ per 1 g of the water-repellent particle;
(B) a water-repellent resin which is a polymer having a long-chain hydrocarbon group having 7 to 40 carbon atoms; and
(C) a liquid medium.
The water-repellent composition according to [1], wherein the water-repellent particle is a particle having a hydrophobicity rate of 20% or more.
The water-repellent composition according to [1] or [2], wherein the number of surface alkyl groups of the water-repellent particle is $1,000 \times 10^{18}$ to $10,000 \times 10^{18}$ per 1 g of the water-repellent particle.
The water-repellent composition according to any one of [1] to [3], wherein the water-repellent particle is at least one inorganic particle selected from hydrophobic silica obtained by treating silica with a hydrophobizing agent and hydrophobic alumina obtained by treating alumina with a hydrophobizing agent, or a hydrophobic organic particle.
The water-repellent composition according to any one of [1] to [4], wherein an average primary particle diameter of the water-repellent particle is 1 to 100 nm.
The water-repellent composition according to any one of [1] to [5], wherein the long-chain hydrocarbon group having 7 to 40 carbon atoms is a stearyl group, an icosyl group, or a behenyl group, in the water-repellent resin.
The water-repellent composition according to [6], wherein the polymer having a long-chain hydrocarbon group having 7 to 40 carbon atoms has a repeating unit formed from an acrylic monomer having a long-chain hydrocarbon group having 7 to 40 carbon atoms, and the acrylic monomer having a long-chain hydrocarbon group is a monomer represented by the formula:

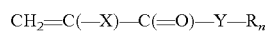

wherein X is a hydrogen atom, a methyl group, or a halogen atom other than a fluorine atom, Y is a group (other than a hydrocarbon group) composed of at least one or more selected from a divalent or trivalent hydrocarbon group having 1 carbon atom, —$C_6H_6$—, —O—, —C(=O)—, —S(C=O)$_2$—, or —NH—, R is a hydrocarbon group having 7 to 40 carbon atoms, and n is an integer of 1 to 3.

The water-repellent composition according to [6] or [7], wherein X is a hydrogen atom, a methyl group, or a chlorine atom, in the acrylic monomer having a long-chain hydrocarbon group.

The water-repellent composition according to any one of [1] to [8], wherein a weight ratio of the water-repellent particle to the water-repellent resin is 25:75 to 90:10, and a total amount of (A) the water-repellent particle and (B) the water-repellent resin is 0.5 to 50% by weight based on the water-repellent composition.

The water-repellent composition according to any one of [1] to [9], wherein the liquid medium is an organic solvent and/or water.

The water-repellent composition according to any one of [1] to [10], wherein the water-repellent composition does not contain a fluorine atom.

The water-repellent composition according to any one of [1] to [11], wherein the water-repellent composition is for a textile product.

A method for treating a fiber, comprising treating a fiber with a treatment liquid comprising the water-repellent composition according to any one of [1] to [12].

A method for producing a treated textile product, comprising treating a fiber by the method according to item [13].

A film formed from the water-repellent composition according to any one of [1] to [12].

A textile product treated with a treatment liquid comprising the water-repellent composition according to any one of [1] to [12].

A textile product having a surface to which the water-repellent particle and the water-repellent resin in the water-repellent composition according to any one of [1] to [12] are adhered.

A textile product treated with a fluorine-free water-repellent agent and having a water sliding speed of 300 mm/sec or more.

A textile product treated with a treatment liquid comprising the water-repellent composition according to any one of [1] to [12] and having a water sliding speed of 300 mm/sec or more, wherein the water-repellent particle and the water-repellent resin which are adhered to a surface of the textile product cover a fiber surface by 80% or more without substantially aggregating with a size of 10 μm or more.

Advantageous Effects of Invention

The water-repellent composition of the present disclosure can impart excellent water-repellency to a substrate such as a textile product. The textile product treated with the water-repellent composition of the present disclosure is excellent in water droplet slidability. In addition, the sliding speed is particularly high, and thus it is suitable for an application requiring high water-repellency.

Unlike a conventional anti-slipping agent, the water-repellent composition of the present disclosure provides high water-repellency (for example, high strong water-repellency) because the water-repellent composition provides a large number of fine unevenness on the surface of a substrate.

DESCRIPTION OF EMBODIMENTS

The water-repellent composition comprises a water-repellent particle (A), a water repellent resin (B), and a liquid medium (C). In some embodiments, the water-repellent composition consists only of a water-repellent particle (A), a water-repellent resin (B), and a liquid medium (C).

The water-repellent particle (A) and the water-repellent resin (B) are active ingredients which develop water repellency. In some embodiments, a weight ratio of the water-repellent particle (A) to the water-repellent resin (B) is 10:90 to 95:5, preferably 25/75 to 90/10, more preferably 30/65 to 88/12, for example, 35/65 to 85/15, particularly 40/60 to 80/20. When the weight ratio is within this range, the strong water-repellency (slidability and sliding speed of a water droplet) is high without the water-repellent particle falling off.

The water-repellent composition optionally comprises a fluorine atom, but preferably does not comprise a fluorine atom. None of the water-repellent particle (A), the water-repellent resin (B), and the liquid medium (C) preferably has a fluorine atom. The water-repellent composition (all of the water-repellent particle (A), the water-repellent resin (B), and the liquid medium (C)) is preferably fluorine-free.

(A) Water-repellent particle

The water-repellent composition comprises (A) a water-repellent particle.

The water-repellent particle (A) is preferably a particle having a hydrophobicity rate of 20% or more. In some embodiments, the hydrophobicity rate is, for example, 20 to 100%, particularly 25 to 99%. The hydrophobicity rate is determined as follows: 1 g of a sample is measured into a separating funnel (200 ml), 100 ml of pure water is added thereto and the funnel is stoppered, the funnel is shaken in a tumbler mixer for 10 minutes and left to stand for 10 minutes, then 20 to 30 ml of the lower layer is extracted from the funnel, the mixed liquid in the lower layer is separated into a quartz cell (10 mm) and subjected to a colorimeter with pure water as a blank, and the transmittance at 500 nm is defined as the hydrophobicity rate.

The hydrophobicity of the particle can also be evaluated by an M value. The M value is preferably 45 or more or 50 or more. In some embodiments, the upper limit of the M value is 70 or 75. The M value can be measured as follows: 0.2 g of a sample is added to 50 ml of water, methanol is added thereto with stirring, and the volume % of methanol in the methanol-water mixed solvent at the end point, which is when the whole amount of the sample powder is wetted with the solvent, is defined as the degree of hydrophobicity (M value). The M value is a numerical value which reflects the affinity of the particle for the hydrophilic solvent (methanol), and thus the hydrophobicity rate described above is preferable from the viewpoint of evaluating the hydrophobicity of the particle.

In some embodiments, the water-repellent particle (A) is made of an inorganic material and/or an organic material.

Examples of the inorganic material include silicon oxide, alumina, silicon carbide, silicon nitride, sapphire, forsterite, silicon carbide, silicon oxide, and silicon nitride.

Examples of the organic material include an olefin resin (for example, polyethylene, polypropylene, or polyisobutylene), a polyester resin (for example, polyethylene terephthalate), an acrylic resin, unsaturated polyester, polyvinyl chloride, polyvinylidene chloride, polyvinyl acetate, polyvinyl alcohol, polyvinyl acetal, polyacrylonitrile, polystyrene, an acetal resin, polycarbonate, polyamide, a phenol resin, a urea resin, an epoxy resin, a melamine resin, styrene/acrylonitrile copolymer, acrylonitrile/butadiene styrene copolymer, a silicon resin, polyphenylene oxide, and polysulfone. A preferable organic material is an acrylic resin or polystyrene.

In some embodiments, a particle of an inorganic material and/or an organic material is used as it is, but it is preferable to surface-treat the particle with a hydrophobizing agent. The hydrophobizing agent is a substance which replaces a hydrophilic group (for example, a hydroxyl group) present on the surface of a particle of an inorganic material and/or an organic material with a hydrophobic group by a chemical reaction. Examples of the hydrophobizing agent include a chlorosilane (for example, methyltrichlorosilane, dimethyldichlorosilane, or trimethylchlorosilane); an alkoxysilane (for example, a tetraalkoxysilane such as tetramethoxysilane or tetraethoxysilane; a monoalkyltrialkoxysilane such as methyltrimethoxysilane or methyltriethoxysilane; a dialkyldialkoxysilane such as dimethyldimethoxysilane, dimethyldiethoxysilane, or diethyldiethoxysilane; a trialkylmonoalkoxysilane such as trimethylmethoxysilane, trimethylethoxysilane, or triethylethoxysilane); an alkylsilane (for example, triethylsilane or octylsilane); and an alkylsilazane (for example, hexamethyldisilazane, 1,3-divinyl 1,1,3,3-tetramethyldisilazane, octamethyltrisilazane, or hexamethylcyclotrisilazane). In some embodiments, in the hydrophobizing agent, the number of carbon atoms of each of the alkyl group and the alkoxy group is, for example, 1 to 10, particularly 1 or 2.

Examples of the hydrophobic group include a hydrocarbon group such as an alkyl group and an alkyl-substituted silyl group such as a trialkylsilyl group. In some embodiments, the number of carbon atoms of each of the hydrocarbon group, the alkyl group, and the alkyl-substituted silyl group is, for example, 1 to 10, particularly 1 or 2.

The number of surface alkyl groups, X, per 1 g of the particle is generally $600 \times 10^{18}$ to $50,000 \times 10^{18}$. Preferable is a particle hydrophobically treated such that the number of surface alkyl groups, X, per 1 g of the particle is, for example, $1,000 \times 10^{18}$ to $10,000 \times 10^{18}$, particularly $1,200 \times 10^{18}$ to $5,000 \times 10^{18}$, especially $1,300 \times 10^{18}$ to $3,000 \times 10^{18}$ (or $1,350 \times 10^{18}$ to $2,000 \times 10^{18}$). Alternatively, in some embodiments, the number of surface alkyl groups, X, per 1 g of the particle is $800 \times 10^{18}$ to $3,000 \times 10^{18}$ or $900 \times 10^{18}$ to $1,800 \times 10^{18}$.

The number of surface alkyl groups, X, per 1 g is calculated by the following equation:

$$X = \{[(L/B) \times C \times D]/100\} \times 10^{18}$$

wherein

L is the number of groups reacting with a hydrophobic group per 1 g of the particle before treatment with a hydrophobizing agent, B is the number of reaction points of the hydrophobizing agent with the particle, C is the number of hydrophobic alkyl groups of the hydrophobizing agent, and D is a degree of treatment of the hydrophobizing agent.

For example, when the particle is silica, $L = 2.5 \times A$ (A is a specific surface area of the particle), and the number of silanol groups per 1 g of silica can be calculated.

For example, when the hydrophobizing agent is methyltrichlorosilane, B is 3 and C is 1, when the hydrophobizing agent is methyltrimethoxysilane, B is 3 and C is 1, when the hydrophobizing agent is dimethyldiethoxysilane, B is 2 and C is 2, when the hydrophobizing agent is triethylethoxysilane, B is 1 and C is 3, and when the hydrophobizing agent is 1,1,1,3,3,3-hexamethyldisilazane, B is 2 and C is 6.

The degree of treatment, D, of the hydrophobizing agent means:

(Number of surface-reactive hydroxyl groups before hydrophobization treatment—Number of surface-reactive hydroxyl groups after treatment with hydrophobizing agent)/Number of surface-reactive hydroxyl groups before hydrophobization treatment*100.

The reactive hydroxyl group (surface-reactive hydroxyl group) is preferably a silanol group (surface-reactive silanol group).

The degree of treatment, D, can usually be calculated by elemental analysis.

In some embodiments, a hydrophilic group is present on the surface of the particle, but is preferably not present on the surface of the particle. Examples of the hydrophilic group include a hydroxyl group, an amino group, and a carboxyl group.

A chemical surface treatment (a surface treatment by a chemical reaction) is preferably carried out by a wet treatment method or a dry treatment method, particularly by a dry treatment method. In the dry treatment method, a hydrophobizing agent (liquid) is adhered to the surface of a particle (solid) of an inorganic material and/or an organic material, and a surface chemical reaction is carried out under an atmosphere of an inert gas such as nitrogen or argon gas at a temperature of 50 to 300° C., for example, 100 to 250° C. for, for example, 5 to 100 minutes.

Alternatively, in some embodiments, in the surface treatment, the hydrophobizing agent is a substance which physically covers the surface of the particle of an inorganic material and/or an organic material without reacting with the surface of the particle, to make the surface of the particle hydrophobic. Examples of such a hydrophobizing agent include a silicone oil, a paraffin base oil, a naphthene base oil, and a polyol ester oil.

It is preferable not to use a hydrophilizing agent (for example, a chlorosilane having a hydroxyl group or an amino group) in the surface treatment.

A physical surface treatment (a surface treatment by physical adsorption) is preferably carried out by a dry treatment method. In the dry treatment method, a hydrophobizing agent (liquid) is adhered to the surface of a particle (solid) of an inorganic material and/or an organic material, and the hydrophobizing agent is adhered to the surface of the particle under an atmosphere of an inert gas such as nitrogen or argon gas at a temperature of 50 to 360° C. for, for example, 5 to 100 minutes.

Specific examples of the preferable water-repellent particle (A) include hydrophobic silica obtained by treating silica with a hydrophobizing agent, hydrophobic alumina obtained by treating alumina with a hydrophobizing agent, and hydrophobic titania obtained by treating titania with a hydrophobizing agent.

The water-repellent particle (A) is a fine particle. In some embodiments, the average primary particle diameter of the water-repellent particle (A) is 0.5 to 200 nm, more preferably 1 to 100 nm, for example, 2 to 50 nm, particularly 3 to 30 nm. Particularly, the average primary particle diameter is preferably 1 to 20 nm. The average primary particle diameter means an average Feret diameter of 100 or more independent smallest unit particles (primary particles) selected at random which are observed with a scanning electron microscope (SEM).

In some embodiments, the specific surface area of the water-repellent particle (A) is 10 $m^2/g$ to 500 $m^2/g$, for example, 50 m²/g to 400 m²/g, particularly 100 m²/g to 350 m²/g. The specific surface area can be measured by a BET method.

In some embodiments, the amount of the water-repellent particle (A) is 0.01 to 50% by weight, particularly 0.1 to 40% by weight, for example, 1 to 30% by weight, based on the water-repellent composition.

In some embodiments, the amount of the water-repellent particle (A) is 10 to 95% by weight, preferably 25 to 90% by weight, more preferably 30 to 88% by weight, for example, 35 (or 33) to 85% by weight, particularly 40 to 80% by weight, based on the total weight of the water-repellent particle (A) and the water-repellent resin (B). When the amount is within this range, the strong water-repellency (slidability and sliding speed of a water droplet) is high without the water-repellent particle falling off.

(B) Water-Repellent Resin

The water-repellent composition comprises (A) a water-repellent resin (B).

In general, the water-repellent resin comprises a polymer having a long-chain hydrocarbon group having 7 to 40 carbon atoms. The polymer means a reaction product obtained by reacting at least two compounds (for example, monomers) (one compound or two compounds). The polymer includes not only a reaction product having a large molecular weight (for example, a molecular weight of 2,000 to 10,000,000) but also a reaction product which is an oligomer (for example, a molecular weight of 200 to less than 2,000).

The long-chain hydrocarbon group having 7 to 40 carbon atoms is preferably a linear or branched hydrocarbon group having 7 to 40 carbon atoms. Preferably, the number of carbon atoms of the long-chain hydrocarbon group is 10 to 40, for example, 12 to 30, particularly 16 to 26. The long-chain hydrocarbon group is particularly preferably a stearyl group, an icosyl group, or a behenyl group.

A side chain of the polymer has a long-chain hydrocarbon group having 7 to 40 carbon atoms. Examples of the side chain of the polymer include a group represented by the formula:

—Y'—R$_n$ wherein Y' is a hydrocarbon group having 1 to 10 carbon atoms,

R is a long-chain hydrocarbon group having 7 to 40 carbon atoms, and n is an integer of 1 to 3, and a group represented by —C(=O)—Y''—R$_n$ wherein Y'' is a group composed of at least one or more selected from a divalent or trivalent hydrocarbon group having 1 carbon atom, —C$_6$H$_6$—, —O—, —C(=O)—, —S(C=O)$_2$—, or —NH—, or a hydrocarbon group having 1 to 10 carbon atoms, R is a long-chain hydrocarbon group having 7 to 40 carbon atoms, and n is an integer of 1 to 3.

Specific examples of Y' include cyclic hydrocarbon groups, such as a cyclic aliphatic group and an aromatic group.

Specific examples of Y'' include —O—, —NH—, —O—C(=O)—, —C(=O)—NH—, —NH—C(=O)—, —O—C(=O)—NH—, —NH—C(=O)—O—, —NH—C(=O)—NH—, —O—C$_6$H$_6$—, —O—(CH$_2$)$_m$—O—, —NH—(CH$_2$)$_m$—NH—, —O—(CH$_2$)$_m$—NH—, —NH—(CH$_2$)$_m$—O—, —O—(CH$_2$)$_m$—O—C(=O)—, —O—(CH$_2$)$_m$—C(=O)—O—, —NH—(CH$_2$)$_m$—O—C(=O)—, —NH—(CH$_2$)$_m$—C(=O)—O—, —O—(CH$_2$)$_m$—O—C(=O)—NH—, —O—(CH$_2$)$_m$—C(=O)—NH—, —O—(CH$_2$)$_m$—NH—C(=O)—, —O—(CH$_2$)$_m$—NH—C(=O)—NH—, —O—(CH$_2$)$_m$—O—C$_6$H$_6$—, —NH—(CH$_2$)$_m$—O—C(=O)—, —NH—(CH$_2$)$_m$—C(=O)—NH—, —NH—(CH$_2$)$_m$—NH—C(=O)—, —NH—(CH$_2$)$_m$—NH—C(=O)—O—, —NH—(CH$_2$)$_m$—NH—C(=O)—NH—, —NH—(CH$_2$)$_m$—O—C$_6$H$_6$—, and —NH—(CH$_2$)$_m$—NH—C$_6$H$_6$— wherein m is an integer of 1 to 5, particularly 2 or 4.

Examples of a main chain of the polymer having a long-chain hydrocarbon group include polyacrylate, polyurethane, polyolefin, polyester, polyether, polyamide, polyimide, polystyrene, and a combination thereof.

In general, with respect to the monomers constituting the polymer having a long-chain hydrocarbon group, for example, polyisocyanate and/or polyol in polyurethane can be classified into monomers in addition to an acrylic monomer in polyacrylate.

A long-chain hydrocarbon group can be introduced into a polymer having no long-chain hydrocarbon group by a polymer reaction to produce a polymer having a long-chain hydrocarbon group.

For example, the polymer having a long-chain hydrocarbon group preferably has a repeating unit formed from an acrylic monomer having a long-chain hydrocarbon group having 7 to 40 carbon atoms. Alternatively, in some embodiments, the polymer having a long-chain hydrocarbon group is a polyurethane having a long-chain hydrocarbon group having 7 to 40 carbon atoms.

An acrylic monomer having a long-chain hydrocarbon group having 7 to 40 carbon atoms can form a polymer having a long-chain hydrocarbon group.

(a) Acrylic Monomer Having a Long-Chain Hydrocarbon Group

The acrylic monomer having a long-chain hydrocarbon group (a) is preferably a monomer represented by the formula:

CH$_2$=C(—X)—C(=O)—Y—R$_n$ wherein X is a hydrogen atom, a monovalent organic group, or a halogen atom other than a fluorine atom, Y is a group (other than a hydrocarbon group) composed of at least one or more selected from a divalent to tetravalent hydrocarbon group having 1 carbon atom, —C$_6$H$_6$—, —O—, —C(=O)—, —S(C=O)$_2$—, or —NH—, R is a hydrocarbon group having 7 to 40 carbon atoms, and n is an integer of 1 to 3.

In some embodiments, X is a hydrogen atom, a methyl group, a halogen other than a fluorine atom, a substituted or unsubstituted benzyl group, or a substituted or unsubstituted phenyl group. Examples of X include a hydrogen atom, a methyl group, a chlorine atom, a bromine atom, an iodine atom, and a cyano group. The less rigid the main chain of the obtained polymer, the less likely it is to inhibit the crystallinity of a side chain, and thus X is preferably a hydrogen atom, a methyl group, or a chlorine atom, more preferably a hydrogen atom or a methyl group, particularly preferably a hydrogen atom.

Y is preferably a group (other than a hydrocarbon group) composed of at least one or more selected from a hydrocarbon group having 1 carbon atom, —C$_6$H$_4$—, —O—, —C(=O)—, —S(=O)$_2$—, or —NH—. Examples of the hydrocarbon group having 1 carbon atom include —CH$_2$—, —CH= having a branched structure, or —C— having a branched structure.

In some embodiments, Y is —Y'—, —Y'—Y'—, —Y'—C(═O)—, —C(═O)—Y'—, —Y'—C(═O)—Y'—, —Y'—R'—, —Y'—R'—Y'—, —Y'—R'—Y'—C(═O)—, —Y'—R'—C(═O)—Y'—, —Y'—R'—Y'—C(═O)—Y'—, or —Y'—R'—Y'—R'— wherein Y' is a direct bond, —O—, —NH—, or —S(═O)$_2$—, and R' is —(CH$_2$)$_m$— (m is an integer of 1 to 5) or —C$_6$H$_4$—(phenylene group).

Specific examples of Y include —O—, —NH—, —O—C(═O)—, —C(═O)—NH—, —NH—C(═O)—, —NH—S(═O)$_2$—, —S(═O)$_2$—NH—, —O—C(═O)—NH—, —NH—C(═O)—O—, —NH—C(═O)—NH—, —O—C$_6$H$_6$—, —O—(CH$_2$)$_m$—O—, —NH— (CH$_2$)$_m$—NH—, —O— (CH$_2$)$_m$—NH—, —NH— (CH$_2$)$_m$—O—, —O—(CH$_2$)$_m$—O—C(═O)—, —O— (CH$_2$)$_m$—C(═O)—O—, —NH— (CH$_2$)$_m$—O—C(═O)—, —NH— (CH$_2$)$_m$—C(═O)—O—, —O— (CH$_2$)$_m$—O—C(═O)—NH—, —O— (CH$_2$)$_m$—NH— C(═O)—O—, —O— (CH$_2$)$_m$—C(═O)—NH—, —O— (CH$_2$)$_m$—NH—C(═O)—, —O— (CH$_2$)$_m$—NH—C(═O)—NH—, —O— (CH$_2$)$_m$—O—C$_6$H$_6$—, —NH— (CH$_2$)$_m$—O—C(═O)—NH—, —NH— (CH$_2$)$_m$—NH—C(═O)—O—, —NH— (CH$_2$)$_m$—C(═O)—NH—, —NH—(CH$_2$)$_m$—NH—C(═O)—, —NH— (CH$_2$)$_m$—NH—C(═O)—NH—, —NH— (CH$_2$)$_m$—O—C$_6$H$_6$—, —NH— (CH$_2$)$_m$—NH—C$_6$H$_6$—, —NH— (CH$_2$)$_m$—NH—S(═O)$_2$—, or —NH—(CH$_2$)$_m$—S(═O)$_2$—NH— wherein m is an integer of 1 to 5, particularly 2 or 4.

Y is preferably —O—, —NH—, —O—(CH$_2$)$_m$—O—C(═O)—, —O—(CH$_2$)$_m$—NH—C(═O)—, —O—(CH$_2$)$_m$—O—C(═O)—NH—, —O— (CH$_2$)$_m$—NH—C(═O)—O—, —O— (CH$_2$)$_m$—NH—C(═O)—NH—, —O— (CH$_2$)$_m$—NH—S(═O)$_2$—, —O—(CH$_2$)$_m$—S(═O)$_2$—NH—, —NH— (CH$_2$)$_m$—NH—S(═O)$_2$—, or —NH— (CH$_2$)$_m$—S(═O)$_2$—NH— wherein m is an integer of 1 to 5, particularly 2 or 4.

More preferably, Y is —O— or —O— (CH$_2$)$_m$—NH—C(═O)—, particularly —O— (CH$_2$)$_m$—NH—C(═O)—.

R is preferably a linear or branched hydrocarbon group. In some embodiments, the hydrocarbon group is particularly a linear hydrocarbon group. Preferably, the hydrocarbon group is an aliphatic hydrocarbon group, particularly a saturated aliphatic hydrocarbon group, especially an alkyl group. If the number of carbon atoms of the hydrocarbon group is small, the crystallinity of side chains decreases, and further the water-repellent performance decreases. If the number of carbon atoms of the hydrocarbon group is too large, the melting point of a monomer having the corresponding hydrocarbon group is high, and thus problems such as a decrease in the solubility of the monomer and instability of emulsification during polymerization can occur. Preferably, the number of carbon atoms of the hydrocarbon group is 12 to 30, for example, 16 to 26, particularly 18 to 22.

n is an integer of 1 to 3, preferably 1.

When Y has a tetravalent hydrocarbon group having 1 carbon atom, n is preferably 3. When Y has a trivalent hydrocarbon group having 1 carbon atom, n is preferably 2. When Y has neither of trivalent and tetravalent hydrocarbon groups having 1 carbon atom, n is 1.

Examples of the acrylic monomer (a) having a long-chain hydrocarbon group include:

(a1) an acrylic monomer in which C(═O)—O- or C(═O)—NH-is directly bonded to a hydrocarbon group having 7 to 40 carbon atoms, and (a2) an acrylic monomer in which C(═O)—O- or C(═O)—NH-is not directly bonded to a hydrocarbon group having 7 to 40 carbon atoms.

The acrylic monomer (a2) is a compound different from the acrylic monomer (a1).

(a1) Acrylic Monomer

The acrylic monomer (a1) is preferably a compound represented by the formula:

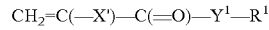

wherein $X^1$ is a hydrogen atom, a monovalent organic group, or a halogen atom other than a fluorine atom, $Y^1$ is —O— or —NH—, and $R^1$ is a hydrocarbon group having 7 to 40 carbon atoms.

The acrylic monomer (a1) is a long-chain acrylate ester monomer wherein Y' is —O— or a long-chain acrylamide monomer wherein Y' is —NH—.

In some embodiments, $X^1$ is a hydrogen atom, a methyl group, a halogen other than a fluorine atom, a substituted or unsubstituted benzyl group, or a substituted or unsubstituted phenyl group. Examples of $X^1$ include a hydrogen atom, a methyl group, a chlorine atom, a bromine atom, an iodine atom, and a cyano group. The less rigid the main chain of the obtained polymer, the less likely it is to inhibit the crystallinity of a side chain, and thus $X^1$ is preferably a hydrogen atom, a methyl group, or a chlorine atom, more preferably a hydrogen atom or a methyl group, particularly preferably a hydrogen atom.

$Y^1$ is —O— or —NH—.

$R^1$ is preferably a linear or branched hydrocarbon group. In some embodiments, the hydrocarbon group is particularly a linear hydrocarbon group. Preferably, the hydrocarbon group is an aliphatic hydrocarbon group, particularly a saturated aliphatic hydrocarbon group, especially an alkyl group. If the number of carbon atoms of the hydrocarbon group is small, the crystallinity of side chains decreases, and further the water-repellent performance decreases. If the number of carbon atoms of the hydrocarbon group is too large, the melting point of a monomer having the corresponding hydrocarbon group is high, and thus problems such as a decrease in the solubility of the monomer and instability of emulsification during polymerization can occur. Preferably, the number of carbon atoms of the hydrocarbon group is 12 to 30, for example, 16 to 26, particularly 18 to 22.

Preferable specific examples of the long-chain acrylate ester monomer include stearyl (meth)acrylate, icosyl (meth)acrylate, behenyl (meth)acrylate, stearyl α-chloroacrylate, icosyl α-chloroacrylate, and behenyl α-chloroacrylate.

Preferable specific examples of the long-chain acrylamide monomer are stearyl (meth)acrylamide, icosyl (meth)acrylamide, and behenyl (meth)acrylamide.

(a2) Acrylic Monomer

The acrylic monomer (a2) is a compound different from the acrylic monomer (a1). In some embodiments, the acrylic monomer (a2) is a (meth)acrylate or a (meth)acrylamide having a group composed of at least one or more selected from —O—, —C(═O)—, —S(═O)$_2$—, or —NH—, between C(═O)—O- or C(═O)—NH- and a hydrocarbon group having 7 to 40 carbon atoms.

The acrylic monomer (a2) is preferable a compound represented by the formula:

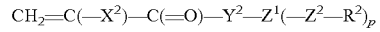

wherein $X^2$ is a hydrogen atom, a monovalent organic group, or a halogen atom other than a fluorine atom, $Y^2$ is —O— or —NH—, $Z^1$ is a direct bond or a divalent or trivalent hydrocarbon group having 1 to 5 carbon atoms, $Z^2$ is each independently a group composed of at least one or more selected from a direct bond, —O—, —C(=O)—, —S(=O)$_2$—, or —NH—, $R^2$ is each independently a hydrocarbon group having 7 to 40 carbon atoms, and p is 1 or 2.

The acrylic monomer (a2) is a long-chain acrylate ester monomer wherein $Y^2$ is —O— or a long-chain acrylamide monomer wherein $Y^2$ is —NH—.

In some embodiments, $X^2$ is a hydrogen atom, a methyl group, a halogen other than a fluorine atom, a substituted or unsubstituted benzyl group, or a substituted or unsubstituted phenyl group. Examples of $X^2$ include a hydrogen atom, a methyl group, a chlorine atom, a bromine atom, an iodine atom, and a cyano group.

The less rigid the main chain of the obtained polymer, the less likely it is to inhibit the crystallinity of a side chain, and thus $X^2$ is preferably a hydrogen atom, a methyl group, or a chlorine atom, more preferably a hydrogen atom or a methyl group, particularly preferably a hydrogen atom.

$Y^2$ is —O— or —NH—.

$Z^1$ is a direct bond or a divalent or trivalent hydrocarbon group having 1 to 5 carbon atoms, and optionally has a linear structure or a branched structure. Preferably, the number of carbon atoms of $Z^1$ is 2 to 4, particularly 2. Specific examples of $Z^1$ include a direct bond, —CH$_2$—, —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$—, —CH$_2$CH= having a branched structure, —CH$_2$(CH—)CH$_2$— having a branched structure, —CH$_2$CH$_2$CH= having a branched structure, —CH$_2$CH$_2$CH$_2$CH$_2$CH= having a branched structure, —CH$_2$CH$_2$(CH—)CH$_2$— having a branched structure, and —CH$_2$CH$_2$CH$_2$CH= having a branched structure. Preferably, $Z^1$ is not a direct bond.

Specific examples of $Z^2$ include a direct bond, —O—, —NH—, —O—C(=O)—, —C(=O)—O—, —C(=O)—NH—, —NH—C(=O)—, —NH—S(=O)—, —S(=O)—NH—, —O—C(=O)—NH—, —NH—C(=O)—O—, —NH—C(=O)—NH—, —O—C$_6$H$_6$—, —O—(CH$_2$)$_m$—O—, —NH—(CH$_2$)$_m$—NH—, —O—(CH$_2$)$_m$—NH—, —NH—(CH$_2$)$_m$—O—, —O—(CH$_2$)$_m$—O—C(=O)—, —O—(CH$_2$)$_m$—C(=O)—O—, —NH—(CH$_2$)$_m$—O—C(=O)—, —NH—(CH$_2$)$_m$—C(=O)—O—, —O—(CH$_2$)$_m$—O—C(=O)—NH—, —O—(CH$_2$)$_m$—NH—C(=O)—O—, —O—(CH$_2$)$_m$—C(=O)—NH—, —O—(CH$_2$)$_m$—NH—C(=O)—, —O—(CH$_2$)$_m$—NH—C(=O)—NH—, —O—(CH$_2$)$_m$—O—C$_6$H$_6$—, —NH—(CH$_2$)$_m$—O—C(=O)—NH—, —NH—(CH$_2$)$_m$—NH—C(=O)—O—, —NH—(CH$_2$)$_m$—C(=O)—NH—, —NH—(CH$_2$)$_m$—NH—C(=O)—, —NH—(CH$_2$)$_m$—NH—C(=O)—NH—, —NH—(CH$_2$)$_m$—O—C$_6$H$_6$—, —NH—(CH$_2$)$_m$—NH—C$_6$H$_6$-wherein m is an integer of 1 to 5, particularly 2 or 4.

$Z^2$ is preferably —O—, —NH—, —O—C(=O)—, —C(=O)—O—, —C(=O)—NH—, —NH—C(=O)—, —NH—S(=O)—, —S(=O)—NH—, —O—C(=O)—NH—, —NH—C(=O)—O—, —NH—C(=O)—NH—, or —O—C$_6$H$_4$—.

$Z^1$ and $Z^2$ are not direct bonds at the same time.

$R^2$ is preferably a linear or branched hydrocarbon group. In some embodiments, the hydrocarbon group is particularly a linear hydrocarbon group. Preferably, the hydrocarbon group is an aliphatic hydrocarbon group, particularly a saturated aliphatic hydrocarbon group, especially an alkyl group. If the number of carbon atoms of the hydrocarbon group is small, the crystallinity of side chains decreases, and further the water-repellent performance decreases. If the number of carbon atoms of the hydrocarbon group is too large, the melting point of a monomer having the corresponding hydrocarbon group is high, and thus problems such as a decrease in the solubility of the monomer and instability of emulsification during polymerization can occur. Preferably, the number of carbon atoms of the hydrocarbon group is 12 to 30, for example, 16 to 26, particularly 18 to 22.

The acrylic monomer (a2) can be produced by reacting hydroxyalkyl (meth)acrylate or hydroxyalkyl (meth)acrylamide with a long-chain alkyl isocyanate. Examples of the long-chain alkyl isocyanate include lauryl isocyanate, myristyl isocyanate, cetyl isocyanate, stearyl isocyanate, oleyl isocyanate, and behenyl isocyanate.

Alternatively, the acrylic monomer (a2) can also be produced by reacting a (meth)acrylate having an isocyanate group in a side chain, for example, 2-methacryloyloxyethyl methacrylate, with a long-chain alkylamine or a long-chain alkyl alcohol. Examples of the long-chain alkylamine include laurylamine, myristylamine, cetylamine, stearylamine, oleylamine, and behenylamine. Examples of the long-chain alkyl alcohol include lauryl alcohol, myristyl alcohol, cetyl alcohol, stearyl isocyanate, oleyl alcohol, and behenyl alcohol.

Specific examples of the acrylic monomer (a2) are as follows. The compounds having the following chemical formulas are an acrylic compound having a hydrogen atom at an α-position, and in some embodiments, specific examples are a methacrylic compound having a methyl group at the α-position and an α chloroacrylic compound having a chlorine atom at the α-position.

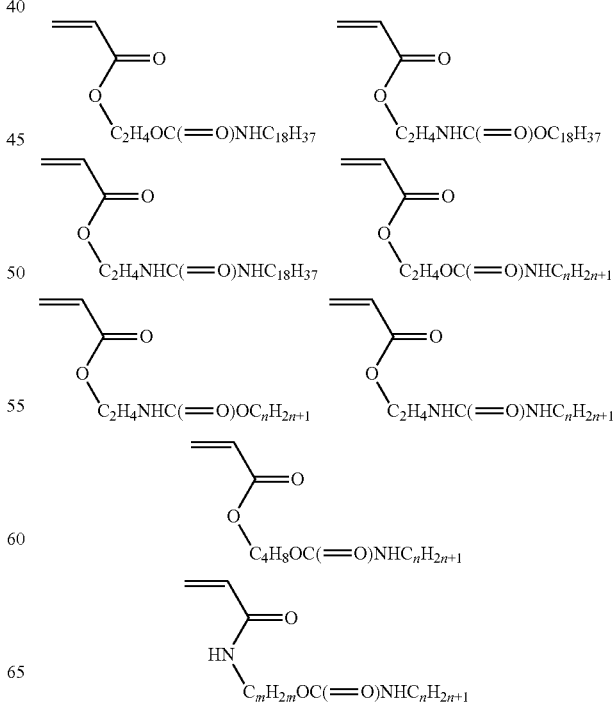

-continued

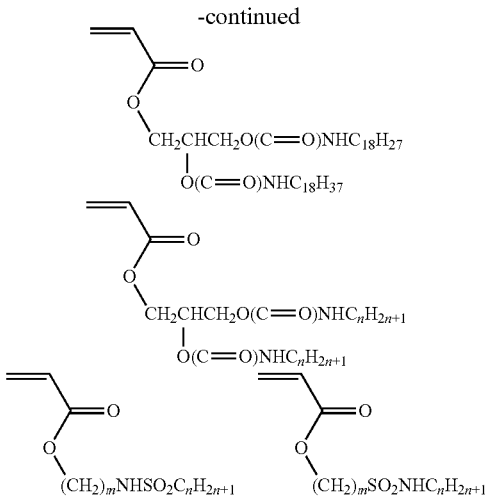

wherein m is an integer of 1 to 5, and n is an integer of 7 to 40.

In some embodiments, the polymer having a long-chain hydrocarbon group comprises a further monomer other than the monomer having a long-chain hydrocarbon group, or does not comprise a further monomer. An example of the further monomer is an acrylic monomer which does not have a long-chain hydrocarbon group.

Specific examples of the further monomer include an acrylic monomer having a short-chain hydrocarbon group having 1 to 6 carbon atoms, a cyclic hydrocarbon group-containing acrylate ester monomer, and a halogenated olefin.

Preferable examples of the short-chain hydrocarbon group having 1 to 6 carbon atoms include a compound represented by the formula:

$$CH_2=C(-X^3)-C(=O)-Y^3-R^3$$

wherein $X^3$ is a hydrogen atom, a monovalent organic group, or a halogen atom other than a fluorine atom,
$Y^3$ is —O— or —NH—, and
$R^3$ is a hydrocarbon group having 1 to 6 carbon atoms (optionally comprising an oxygen atom).

In some embodiments, $X^3$ is a hydrogen atom, a methyl group, a halogen other than a fluorine atom, a substituted or unsubstituted benzyl group, or a substituted or unsubstituted phenyl group. Examples of $X^3$ include a hydrogen atom, a methyl group, a chlorine atom, a bromine atom, an iodine atom, and a cyano group. The less rigid the main chain of the obtained polymer, the less likely it is to inhibit the crystallinity of a side chain, and thus $X^3$ is preferably a hydrogen atom, a methyl group, or a chlorine atom, more preferably a hydrogen atom or a methyl group, particularly preferably a hydrogen atom.

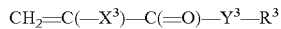

$R^3$ is preferably a linear or branched hydrocarbon group. The linear or branched hydrocarbon group has 1 to 6 carbon atoms. The linear or branched hydrocarbon group preferably has 1 to 4 carbon atoms, and preferably, the linear or branched hydrocarbon group is generally an aliphatic hydrocarbon group, particularly a saturated aliphatic hydrocarbon group, especially an alkyl group. The hydrocarbon group also optionally comprises an oxygen atom.

Particularly preferable specific examples of the short-chain acrylic monomer include methyl (meth)acrylate, methyl α-chloroacrylate, ethyl (meth)acrylate, ethyl α-chloroacrylate, n-butyl (meth)acrylate, t-butyl (meth)acrylate, n-butyl α-chloroacrylate, t-butyl α-chloroacrylate, methyl (meth)acrylamide, n-butyl (meth)acrylamide, t-butyl (meth)acrylamide, glycidyl (meth)acrylate, and glycidyl (meth)acrylamide.

Preferable examples of the cyclic hydrocarbon group-containing acrylic monomer include a compound represented by the formula:

$$CH_2=C(-X^4)-C(=O)-Y^4-R^4$$

wherein $X^4$ is a hydrogen atom, a monovalent organic group, or a halogen atom other than a fluorine atom,
$Y^4$ is —O— or —NH—, and
$R^4$ is a hydrocarbon group of a cyclic hydrocarbon group having 4 to 30 carbon atoms.

The cyclic hydrocarbon group-containing acrylic monomer is preferably a monomer, a homopolymer of which has a glass transition point of, for example, 25° C. or less, particularly 10° C. or less, so as not to inhibit the crystallinity of the polymer having a long-chain hydrocarbon group.

In some embodiments, $X^4$ is a hydrogen atom, a methyl group, a halogen other than a fluorine atom, a substituted or unsubstituted benzyl group, or a substituted or unsubstituted phenyl group. Examples of $X^4$ include a hydrogen atom, a methyl group, a chlorine atom, a bromine atom, an iodine atom, and a cyano group. The less rigid the main chain of the obtained polymer, the less likely it is to inhibit the crystallinity of a side chain, and thus $X^4$ is preferably a hydrogen atom, a methyl group, or a chlorine atom, more preferably a hydrogen atom or a methyl group, particularly preferably a hydrogen atom.

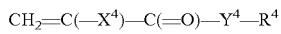

$R^4$ is a cyclic hydrocarbon group optionally having a chain group (for example, a linear or branched hydrocarbon group). Examples of the cyclic hydrocarbon group include a monocyclic group, a polycyclic group, and a bridged ring group, which are saturated or unsaturated. The cyclic hydrocarbon group is preferably saturated. The cyclic hydrocarbon group has 4 to 30 carbon atoms, and preferably 4 to 20 carbon atoms. Examples of the cyclic hydrocarbon group include a cyclic aliphatic group having 4 to 30, preferably 4 to 20, particularly 5 to 12, carbon atoms, an aromatic hydrocarbon group having 6 to 30, preferably 6 to 20, carbon atoms, and an araliphatic hydrocarbon group having 7 to 30, preferably 7 to 20, carbon atoms.

Examples of the cyclic hydrocarbon group include a monocyclic group, a polycyclic group, and a bridged ring group, which are saturated or unsaturated. The cyclic hydrocarbon group is preferably saturated.

The number of carbon atoms of the cyclic hydrocarbon group is particularly preferably 15 or less, for example, 10 or less.

Specific examples of the cyclic hydrocarbon group include a cyclohexyl group, a t-butylcyclohexyl group, an isobornyl group, a dicyclopentanyl group, a dicyclopentenyl group, and an adamantyl group. The acrylate group is preferably an acrylate group or a methacrylate group, particularly preferably an acrylate group.

Specific examples of the monomer having a cyclic hydrocarbon group include cyclohexyl (meth)acrylate, t-butylcyclohexyl (meth)acrylate, benzyl (meth)acrylate, isobornyl (meth)acrylate, dicyclopentanyl (meth)acrylate, dicyclopentenyl (meth)acrylate, dicyclopentanyloxyethyl (meth)acrylate, tricyclopentanyl (meth)acrylate, adamantyl (meth)acrylate, 2-methyl-2-adamantyl (meth)acrylate, 2-ethyl-2-adamantyl (meth)acrylate.

In some embodiments, the halogenated olefin is a halogenated olefin having 2 to 20 carbon atoms substituted with 1 to 10 chlorine atoms, bromine atoms, or iodine atoms. Preferably, the halogenated olefin is a chlorinated olefin having 2 to 20 carbon atoms, particularly an olefin having 2 to 5 carbon atoms and having 1 to 5 chlorine atoms. Preferable specific examples of the halogenated olefin include a vinyl halide such as vinyl chloride, vinyl bromide, or vinyl iodide, and a vinylidene halide such as vinylidene chloride, vinylidene bromide, or vinylidene iodide. The halogenated olefin does not have a fluorine atom.

In some embodiments, the amount of the further monomer is 0 to 50% by weight, for example, 0 to 30% by weight, particularly 1 to 20% by weight, based on the polymer having a long-chain hydrocarbon group.

In some embodiments, the weight average molecular weight (Mw) of the polymer having a long-chain hydrocarbon group is generally 1,000 to 1,000,000, for example, 2,000 to 500,000, particularly 3,000 to 300,000. The weight average molecular weight (Mw) of the polymer having a long-chain hydrocarbon group is generally measured by GPC (gel permeation chromatography).

Alternatively, in some embodiments, the water-repellent resin is a high molecular weight compound obtained by crosslinking a compound having a long-chain hydrocarbon group having 7 to 40 carbon atoms with a cross-linking agent. Here, the crosslinking may be a known crosslinking, and urethane crosslinking is preferable from the viewpoint of close adhesion to the substrate. The cross-linking agent is preferably a polyvalent isocyanate-based cross-linking agent. The compound having a long-chain hydrocarbon group having 7 to 40 carbon atoms preferably has one or more functional groups, for example, hydroxyl groups, capable of urethane crosslinking with an isocyanate.

(b) Polyurethane

In some embodiments, the water-repellent resin is a polyurethane having a long-chain hydrocarbon group having 7 to 40 carbon atoms.

The polyurethane having a long-chain hydrocarbon group having 7 to 40 carbon atoms can be produced by reacting an isocyanate group-containing compound (for example, a monoisocyanate or a polyisocyanate, specifically a diisocyanate) with a hydroxyl group-containing compound having a long-chain hydrocarbon group having 7 to 40 carbon atoms.

The isocyanate group-containing compound is not limited, and may be an aliphatic polyisocyanate compound, an alicyclic polyisocyanate compound, an aromatic polyisocyanate compound, an araliphatic polyisocyanate compound, or a modified product of any of these isocyanate compounds. In addition, these can also be used in combinations of two or more thereof. The isocyanate group-containing compound is preferably an aliphatic polyisocyanate compound, an aromatic polyisocyanate compound, or a modified product of any of these isocyanate compounds.

The aliphatic polyisocyanate compound may be, for example, tetramethylene diisocyanate, dodecamethylene diisocyanate, hexamethylene diisocyanate (HDI), 2,2,4-trimethylhexamethylene diisocyanate, 2,4,4-trimethylhexamethylene diisocyanate, lysine diisocyanate, 2-methylpentane-1,5-diisocyanate, or 3-methylpentane-1,5-diisocyanate. In addition, these can also be used in combinations of two or more thereof.

The alicyclic polyisocyanate compound may be, for example, isophorone diisocyanate, hydrogenated xylylene diisocyanate, 4,4'-dicyclohexylmethane diisocyanate, 1,4-cyclohexanediisocyanate, methylcyclohexylene diisocyanate, or 1,3-bis(isocyanatomethyl)cyclohexane. In addition, these can also be used in combinations of two or more thereof.

The aromatic polyisocyanate compound may be, for example, dialkyldiphenylmethane diisocyanate, tolylene diisocyanate, 2,2'-diphenylmethane diisocyanate, 2,4'-diphenylmethane diisocyanate, 4,4'-diphenylmethane diisocyanate (monomeric MDI), polymethylene polyphenyl polyisocyanate (polymeric MDI), 4,4'-dibenzyl diisocyanate, 1,5-naphthylene diisocyanate, 1,3-phenylene diisocyanate, or 1,4-phenylene diisocyanate. In addition, these can also be used in combinations of two or more thereof.

The araliphatic polyisocyanate compound may be, for example, xylylene diisocyanate, tetraalkyldiphenylmethane diisocyanate, or α,α,α,α-tetramethylxylylene diisocyanate. In addition, these can also be used in combinations of two or more thereof.

The modified product of a polyisocyanate compound may be, for example, an isocyanurate modified product, a biuret modified product, an adduct modified product, a carbodiimide modified product, or a bifunctional modified product. In addition, these can also be used in combinations of two or more thereof.

Examples of the hydroxyl group-containing compound having a long-chain hydrocarbon group having 7 to 40 carbon atoms include a hydroxyl group-containing compound (polyhydric alcohol derivative or polyvalent carboxylic acid derivative) obtained by introducing a long-chain hydrocarbon group having 7 to 40 carbon atoms into a polyhydric alcohol or a polyvalent carboxylic acid such as sorbitan, citrate and pentaerythritol. The hydroxyl group-containing compound having a long-chain hydrocarbon group having 7 to 40 carbon atoms has at least one (for example, one or two or three) hydroxyl group.

Preferable examples of the hydroxyl group-containing compound having a long-chain hydrocarbon group having 7 to 40 carbon atoms include compounds represented by polyhydric alcohol derivatives or polyvalent carboxylic acid derivatives of sorbitan (la), citrate (lb), and pentaerythritol (1c) of the following formulas:

[C2]

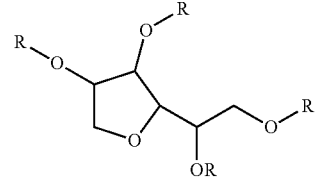
(1a)

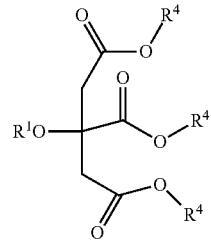
(1b)

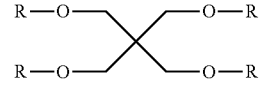
(1c)

wherein each R is independently —H, —R$^1$, —C(O)R$^1$, —(CH$_2$CH$_2$O)$_n$(CH(CH$_3$)CH$_2$O)$_m$R$^2$, or (CH$_2$CH$_2$O)$_n$(CH(CH$_3$) CH$_2$O)$_m$C(O)R$^1$,
each n is independently 0 to 20,
each m is independently 0 to 20,
m+n is greater than 0,
each R$^1$ is independently a long-chain hydrocarbon group having 7 to 40 carbon atoms and optionally containing at least one unsaturated bond, each R$^2$ is independently —H, or a long-chain hydrocarbon group having 7 to 40 carbon atoms and optionally containing at least one unsaturated bond,
each R$^3$ is independently —H, —R$^1$, —C(O)R$^1$, —(CH$_2$CH$_2$O)$_n$'(CH(CH$_3$)CH$_2$O)$_m$, R$^2$, or —(CH$_2$CH$_2$O)$_n$'(CH(CH$_3$)CH$_2$O)$_m$C(O)R$^1$,
each R$^4$ is independently —H, a long-chain hydrocarbon group having 7 to 40 carbon atoms and optionally containing at least one unsaturated bond, or a combination thereof; —(CH$_2$CH$_2$O)$_n$(CH(CH$_3$O)CH$_2$O)$_m$, R$^2$; or —(CH$_2$CH$_2$O)$_n$'(CH(CH$_3$)CH$_2$O)$_m$C(O)R$^1$,
each n' is independently 0 to 20,
each m' is independently 0 to 20,
m'+n' is greater than 0, and
each R$^{19}$ is —H, —C(O)R$^1$, or —CH$_2$C[CH$_2$OR]$_3$.
Provided that when the compound is of formula (Ia), at least one R or R$^2$ is —H,
provided that when the compound is of formula (Ib), at least one R$^2$, R$^3$, or R$^4$ is —H, and
provided that when the compound is of formula (Ic), at least one R$^{19}$ or R is —H.

Specific examples of the hydroxyl group-containing compound having a long-chain hydrocarbon group having 7 to 40 carbon atoms include sorbitan monocarboxylate, sorbitan dicarboxylate, sorbitan tricarboxylate, monoalkyl citrate, dialkyl citrate, trialkyl citrate, pentaerythritol monocarboxylate, pentaerythritol dicarboxylate, and pentaerythritol tricarboxylate. The carboxylate is preferably stearate or behenate. The alkyl is preferably stearyl or behenyl.

In some embodiments, the amount of the water-repellent resin (B) is 0.01 to 50% by weight, 0.1 to 40% by weight, for example, 5 to 30% by weight, based on the water-repellent composition.

In some embodiments, the amount of the water-repellent resin (B) is 5 to 90% by weight, preferably 10 to 75% by weight, more preferably 12 to 70% by weight, for example, 15 to 65% by weight, particularly 20 to 60% by weight (or 30 to 55% by weight), based on the total weight of the water-repellent particle (A) and the water-repellent resin (B).

(C) Liquid Medium

The water-repellent composition contains a liquid medium. The liquid medium is an organic solvent, or water, or a mixture of water and an organic solvent.

The water-repellent composition is generally a solution or dispersion. The solution is a solution in which a polymer is dissolved in an organic solvent. The dispersion is an aqueous dispersion in which a polymer is dispersed in an aqueous medium (water or a mixture of water and an organic solvent).

Examples of the organic solvent include an ester (for example, an ester having 2 to 40 carbon atoms, specifically ethyl acetate or butyl acetate), a ketone (for example, a ketone having 2 to 40 carbon atoms, specifically methyl ethyl ketone, diisobutyl ketone, or methyl isobutyl ketone), an alcohol (for example, an alcohol having 1 to 40 carbon atoms, specifically ethanol, butanol, or isopropyl alcohol), an aromatic solvent (for example, toluene and xylene), and a petroleum-based solvent (for example, alkane having 5 to 10 carbon atoms, specifically, naphtha or kerosene).

In some embodiments, the liquid medium is water alone or a mixture of water and a (water-miscible) organic solvent. In some embodiments, the amount of the organic solvent is 30% by weight or less, for example, 10% by weight or less (preferably 0.1% by weight or more), based on the liquid medium. The aqueous medium is preferably water alone.

In some embodiments, in the water-repellent composition, the amount of the liquid medium (C) is 5 to 99.9% by weight, for example, 10 to 99% by weight, particularly 10 to 80% by weight, based on the water-repellent composition.

(D) Further Component

The water-repellent composition optionally comprises a further component (D) other than a water-repellent particle (A), a water-repellent resin (B), and a liquid medium (C). Examples of the further component (D) include an additive and a surfactant.

(D1) Additive

The water-repellent composition optionally comprises an additive (D1).

Examples of the additive (D1) include a silicon-containing compound, a wax, and an acrylic emulsion. Other examples of the additive include a further polymer, a drying rate adjuster, a cross-linking agent, a film formation agent, a compatibilizer, a surfactant, an antifreezing agent, a viscosity adjuster, a UV absorber, an antioxidant, a pH adjuster, an antifoaming agent, a texture modifier, a slippage modifier, an antistatic agent, a hydrophilizing agent, an antibacterial agent, an antiseptic agent, an insect repellent, a fragrant agent, and a flame retarder.

(D2) Surfactant

The water-repellent composition optionally comprises a surfactant (D2), particularly when the water-repellent composition is an aqueous dispersion. In some embodiments, the surfactant (D2) is one or more surfactants selected from a nonionic surfactant, a cationic surfactant, an anionic surfactant, and an amphoteric surfactant.

In some embodiments, the amount of the further component (D) is 0 to 100 parts by weight, for example, 0.1 to 30 parts by weight, particularly 1 to 10 parts by weight, based on 100 parts by weight in total of the water-repellent particle (A) and the water-repellent resin (B). In some embodiments, the amount of the additive (D1) is 0 to 80 parts by weight, for example, 0.1 to 20 parts by weight, particularly 1 to 10 parts by weight, based on 100 parts by weight in total of the water-repellent particle (A) and the water-repellent resin (B). In some embodiments, the amount of the surfactant (D2) is 0 to 20 parts by weight, for example, 0.1 to 15 parts by weight, particularly 1 to 10 parts by weight, based on 100 parts by weight in total of the water-repellent particle (A) and the water-repellent resin (B).

<Production of Water-Repellent Composition>

The water-repellent composition can be produced by adding a powder of a water-repellent particle to a solution or dispersion of a water-repellent resin. Alternatively, the water-repellent composition can be produced by mixing a solution or dispersion of a water-repellent resin with a dispersion of a water-repellent particle.

The solution of a water-repellent resin is a solution obtained by dissolving the water-repellent resin in an organic solvent. The dispersion of a water-repellent resin is a dispersion obtained by dispersing the water-repellent resin in an aqueous medium. The dispersion of a water-repellent particle is a dispersion obtained by dispersing the water-repellent particle in an aqueous medium.

Since the water-repellent composition has high water-repellency, the water-repellent composition is preferably subjected to an ultrasonic wave (ultrasonic treatment). The ultrasonic treatment is preferably carried out immediately before application to a substrate to be treated. For example, the water-repellent composition is applied to the substrate after 1 minute to 1 hour from the ultrasonic treatment. The ultrasonic treatment can be carried out by applying an ultrasonic wave to the water-repellent composition.

The ultrasonic generator is not limited, and an output of 500 W or more, for example, 500 to 2000 W, is preferable in that it can provide efficient mixing. In some embodiments, the treatment time of the ultrasonic treatment is 0.5 minutes to 60 minutes. For example, a uniform water-repellent composition can be obtained by treatment for 10 minutes using a 500-W ultrasonic generator.

Although not bound to theory, it is thought that aggregated particles resulting from aggregation of primary particles are separated into primary particles by ultrasonic treatment (ultrasonic cleaning), and that possession of a preferable particle diameter can provide high water-repellency.

In general, the solution or dispersion of a water-repellent resin is a solution or dispersion of a polymer having a long-chain hydrocarbon group.

The polymer having a long-chain hydrocarbon group can be produced by any of the usual polymerization methods, and the conditions of the polymerization reaction can be arbitrarily selected. Examples of such a polymerization method include a solution polymerization, a suspension polymerization, and an emulsion polymerization.

In the solution polymerization, a method involving dissolving a monomer in an organic solvent in the presence of a polymerization initiator, carrying out nitrogen purging, and then heating and stirring the resulting solution in the range of 30 to 120° C. for 1 to 10 hours is adopted. Examples of the polymerization initiator include azobisisobutyronitrile, benzoyl peroxide, di-t-butyl peroxide, lauryl peroxide, cumene hydroperoxide, t-butyl peroxypivalate, and diisopropyl peroxydicarbonate. The polymerization initiator is used in the range of 0.01 to 20 parts by weight, for example, 0.01 to 10 parts by weight, per 100 parts by weight of the monomer.

The organic solvent is inert to a monomer and dissolves the monomer, and, in some embodiments, is, for example, an ester (for example, an ester having 2 to 40 carbon atoms, specifically, ethyl acetate or butyl acetate), a ketone (for example, a ketone having 2 to 40 carbon atoms, specifically, methyl ethyl ketone, diisobutyl ketone, or methyl isobutyl ketone), or an alcohol (for example, an alcohol having 1 to 40 carbon atoms, specifically, ethanol, butanol, or isopropyl alcohol). Examples of the organic solvent include acetone, chloroform, HCHC225, isopropyl alcohol, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichlorethylene, perchloroethylene, tetrachlorodifluoroethane, and trichlorotrifluoroethane. The organic solvent is used in the range of 10 to 3000 parts by weight, for example, 50 to 2000 parts by weight, per 100 parts by weight in total of the monomer.

In the emulsion polymerization, a method involving emulsifying a monomer in water in the presence of a polymerization initiator and an emulsifier, carrying out nitrogen purging, and then stirring the resulting emulsion in the range of 50 to 80° C. for 1 to 20 hours for polymerization is adopted. The polymerization initiator may be a water-soluble one such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine-dihydrochloride, sodium peroxide, potassium persulfate, or ammonium persulfate, or an oil-soluble one such as azobisisobutyronitrile, benzoyl peroxide, di-t-butyl peroxide, lauryl peroxide, cumene hydroperoxide, t-butyl peroxypivalate, or diisopropyl peroxydicarbonate. The polymerization initiator is used in the range of 0.01 to 10 parts by weight per 100 parts by weight of the monomer.

In order to obtain a polymer-water dispersion liquid having excellent standing stability, a monomer is desirably micronized in water and polymerized using an emulsifying apparatus such as a high-pressure homogenizer or an ultrasonic homogenizer which can apply strong crushing energy. In addition, the emulsifier may be any of various anionic, cationic, or nonionic emulsifiers, and is used in the range of 0.5 to 20 parts by weight per 100 parts by weight of the monomer. Anionic and/or nonionic and/or cationic emulsifiers are preferably used. When a monomer is not completely compatible, a compatibilizer which makes such a monomer sufficiently compatible, for example, a water-soluble organic solvent or a low molecular weight monomer, is preferably added. The addition of a compatibilizer can improve emulsifiability and copolymerizability.

Examples of the water-soluble organic solvent include acetone, methyl ethyl ketone, ethyl acetate, propylene glycol, dipropylene glycol monomethyl ether, dipropylene glycol, tripropylene glycol, and ethanol, and, in some embodiments, is used in the range of 1 to 50 parts by weight, for example, 10 to 40 parts by weight, per 100 parts by weight of water. In addition, examples of the low molecular weight monomer include methyl methacrylate, glycidyl methacrylate, and 2,2,2-trifluoroethyl methacrylate, and, in some embodiments, is used in the range of 10 to 50 parts by weight, for example, 10 to 40 parts by weight, per 100 parts by weight in total of the monomer.

A chain transfer agent is optionally used in the polymerization. The molecular weight of the polymer can be changed according to the amount of the chain transfer agent used. Examples of the chain transfer agent include a mercaptan group-containing compound such as lauryl mercaptan, thioglycol, or thioglycerol (particularly, alkyl mercaptan (for example, having 1 to 40 carbon atoms)), and an inorganic salt such as sodium hypophosphite or sodium hydrogen sulfite. In some embodiments, the amount of the chain transfer agent used is used in the range of 0.01 to 10 parts by weight, for example, 0.1 to 5 parts by weight, per 100 parts by weight in total of the monomer.

In some embodiments, the water-repellent composition is in the form of a solution, an emulsion (particularly, an aqueous dispersion), or an aerosol. In some embodiments, in the water-repellent composition, the amount of the liquid medium (C) is 5 to 99.9% by weight, for example, 10 to 99% by weight, particularly 10 to 80% by weight, based on the water-repellent composition.

In some embodiments, in the water-repellent composition, the total concentration of the water-repellent particle (A) and the water-repellent resin (B) is 0.01 to 95% by weight, for example 0.1 to 60% by weight, particularly 0.5 to 30% by weight, based on the water-repellent composition.

<Applications of Water-Repellent Composition>

The water-repellent composition can be applied to a substrate by a conventionally known method. Usually, a method involving dispersing the treatment agent in an organic solvent or water, diluting the resulting dispersion, adhering the diluted dispersion to the surface of the substrate by a known method such as immersion coating, spray coating, foam coating, or cast coating, and drying the same is adopted. In addition, in some embodiments, if necessary, the water-repellent composition is applied together with a suitable cross-linking agent (for example, a blocked isocyanate) for curing. Further, an insect repellent, a softening agent, an antibacterial agent, a flame retarder, an antistatic agent, a coating material fixing agent, a wrinkle-resistant agent, and the like can also be added to the water-repellent composition and used in combination. In some embodiments, the concentration of the polymer having a long-chain hydrocarbon group in a treatment liquid to be contacted with a substrate is 0.01 to 10% by weight (particularly in the case of dip coating), for example, 0.05 to 10% by weight.

Examples of the substrate to be treated with a water-repellent composition (for example, a water- and oil-repellent agent) include a textile product, a stone material, a filter (for example, an electrostatic filter), a dust mask, a fuel cell part (for example, a gas diffusion electrode and a gas diffusion support), glass, paper, wood, leather, fur, asbestos, a brick, cement, a metal and an oxide, a ceramic product, a plastic, a coated surface, and a plaster. Various examples can be mentioned as the textile product. Examples of the textile product include an animal or vegetable natural fiber such as cotton, hemp, wool, or silk, a synthetic fiber such as polyamide, polyester, polyvinyl alcohol, polyacrylonitrile, polyvinyl chloride, or polypropylene, a semi-synthetic fiber such as rayon or acetate, an inorganic fiber such as a glass fiber, a carbon fiber, or an asbestos fiber, and mixed fibers thereof.

In some embodiments, the textile product is in any form of, for example, a fiber, or a fabric.

The water-repellent composition can be applied to a fibrous substrate (for example, a textile product) by any of the methods known for treating a textile product with a liquid. When the textile product is a fabric, in some embodiments, the fabric is dipped in a solution, or a solution is adhered or sprayed onto the fabric. Typical application methods are a dip coating method and a drop casting method. The drop casting method is preferable because excellent adhesion of the water-repellent particle and the water-repellent resin to the textile product can be obtained. The treated textile product is dried and preferably heated at, for example, 100° C. to 200° C.

The textile product to be treated is typically a fabric, which include a woven fabric, a knitted fabric, and a nonwoven fabric, a fabric in the form of clothing, and a carpet, and, in some embodiments, is a fiber or a yarn or an intermediate textile product (for example, a sliver or a roving). In some embodiments, the textile product material is a natural fiber (for example, cotton or wool), a chemical fiber (for example, viscose rayon or lyocell), or a synthetic fiber (for example, polyester, polyamide, or acrylic fiber), or a mixture of fibers (for example, a mixture of a natural fiber and a synthetic fiber). The polymer having a long-chain hydrocarbon group according to the present disclosure is particularly effective in making a cellulosic fiber (for example, cotton or rayon) lipophobic and oil-repellent. In addition, the method of the present disclosure generally makes a textile product hydrophobic and water-repellent.

Alternatively, in some embodiments, the fibrous substrate is leather. In order to make leather hydrophobic and lipophobic, a polymer having a long-chain hydrocarbon group is optionally applied to the leather from an aqueous solution or an aqueous emulsion at various stages of leather processing, for example, during the wetting processing of the leather or during the finishing of the leather.

Alternatively, in some embodiments, the fibrous substrate is paper. A polymer having a long-chain hydrocarbon group is optionally applied to preformed paper or applied to paper at various stages of papermaking, for example, during the drying of the paper.

The term "treatment" means applying a treatment agent to a substrate by dipping, spraying, coating, or the like. In general, the treatment causes a water-repellent particle and a water-repellent resin, which are active ingredients of a treatment agent, to adhere to the surface of a substrate.

In a treated textile product, the water sliding speed is preferably 200 mm/sec or more, for example, 300 mm/sec or more, particularly 350 mm/sec or more.

The water-repellent resin and the water-repellent particle adhering to the surface of a textile product treated with a treatment liquid comprising a water-repellent composition preferably cover the surface of the fiber with an area of 80% or more based on the whole surface of the fiber, as observed using a laser microscope (magnification of 400 times). Substantially no aggregate having a size of 10 μm or more is preferably present on the fiber surface. "Substantially no aggregate is present" means that an area occupied by the aggregate is less than 10%, based on a visual field area, as observed using a laser microscope (magnification of 400 times).

A textile product treated with the water-repellent composition has excellent strong water-repellency, and thus is particularly preferable for sports gear such as various sportswear and sports shoes used outdoors, jogging gear such as jogging wear and jogging shoes, walking gear such as walking wear and walking shoes, mountain climbing gear such as backpacks, tents, and trekking shoes, cycling gear such as cycling wear and cycling bags, or rain gear such as raincoats and rain shoes.

Although the embodiments have been described above, it will be understood that various modifications of the embodiments and details are possible without departing from the purpose and scope of the claims.

EXAMPLES

Hereinafter, the present disclosure will be described in detail with reference to Examples, but the present disclosure is not limited to these Examples.

In the following, parts, % or ratios represent parts by weight, % by weight or weight ratios unless otherwise specified.

The test procedures are as follows.
Hydrophobicity Rate (Particle)

1 g of a sample is measured into a separating funnel (200 ml), 100 ml of pure water is added thereto and the funnel is stoppered, the funnel is shaken in a tumbler mixer for 10 minutes and left to stand for 10 minutes, then 20 to 30 ml of the lower layer is extracted from the funnel, the mixed liquid in the lower layer is separated into a quartz cell (10 mm) and subjected to a colorimeter with pure water as a blank, and the transmittance at 500 nm is defined as the hydrophobicity rate.

M Value 0.2 g of a particle is measured into a 300 mL beaker, added to 50 ml of water, methanol is added thereto with stirring, and the volume % of methanol in the methanol-water mixed solvent at the end point that is when the whole amount of the sample powder is wetted with the solvent is defined as the degree of hydrophobicity (M value).

Sliding Speed

The sliding speed was measured as follows: using a fully automatic contact angle meter (DropMaster701 manufactured by Kyowa Interface Science Co., Ltd.), 20 μL of water was dropped from a microsyringe onto a substrate having an inclination of 30° and how the water slid was photographed using a high-speed camera (VW-9000 manufactured by KEYENCE Corporation) to measure an average sliding speed at a distance of about 40 mm.

Contact Angle and Sliding Angle

The contact angle was measured using a fully automatic contact angle meter (DropMaster701 manufactured by Kyowa Interface Science Co., Ltd.) by dropping 2 μL of water from a microsyringe onto a treatment fabric placed horizontally.

The sliding angle was measured using a fully automatic contact angle meter (DropMaster701 manufactured by Kyowa Interface Science Co., Ltd.) by dropping 20 μL of water from a microsyringe onto a treatment fabric placed horizontally.

Surface State of Fiber

A fiber treated with a treatment liquid was observed using a KEYENCE laser microscope (magnification of 400 times), and if an aggregate having a size of 10 μm or more occupied 50% or more of the field of view, "Bad" was given, if it did 25% or more, "Fair" was given, if it did 10% or more, "Good" was given, and if it did less than 10%, "Very good" was given.

In addition, when the fiber surface is treated with the treatment liquid, the surface state is clearly different from that of the fiber itself because the particle has been blended, and the surface state can be visually determined. The surface coverage of the fiber treated with the treatment liquid was visually determined. If the coverage was 80% or more, "Very good" was given, if the coverage was 50% or more, "Good" was given, if the coverage was 25% or more, "Fair" was given, and if the coverage was 10% or less, "Bad" was given.

Strong Water-Repellency

The water-repellency of a fabric was evaluated according to a spray method of JIS-L-1092 (AATCC-22). At that time, the strong water-repellency was evaluated in terms of the repellency of the water droplets landing on the fabric, the slidability thereof, and the residual property of the water droplets on the fabric, based on the following criteria.

Good: Almost no water droplets are formed and water runs down

Fair: Water drops slide down without staying on the fabric

Bad: Water droplets are formed and slide down, but many water drops stay on the fabric Spray Water-Repellency The water-repellency of a fabric was evaluated according to a spray method of JIS-L-1092 (AATCC-22). As shown in the table below, the water-repellency is represented by the water-repellency No. A higher score shows a better water-repellency, and an intermediate value (95, 85, or 75) is given depending on the state.

| Water-repellency No. | State |
|---|---|
| 100 | No wetting or water drop adhesion on front side |
| 90 | No wetting of front side but adhesion of small water droplets |
| 80 | Wetting in form of small individual water drops of water on front side |
| 70 | Wetting of half of front side and state of small individual wetting penetrating fabric |
| 50 | Wetting of whole front side |
| 0 | Wetting of whole front side and back side |

Bundesmann Water-Repellency

According to the Bundesmann test described in a JIS-L-1092 (C) method, a rain shower was carried out under conditions of a rain shower rate of 80 cc/min, a rain shower water temperature of 20° C., and a rain shower time of 10 minutes to evaluate the water-repellency. The evaluation method is the same as in the spray water-repellency test, and as shown in Table 1, the water-repellency is represented by the water-repellency No.

In the above test, if a numerical value or symbol is marked with a "+" (or "−"), it indicates that the water-repellency is slightly better (or worse) than the rating of the numerical value or symbol.

In the Synthetic Examples and the Examples, the meanings of the abbreviations are as follows.

| Abbreviation | Compound name |
|---|---|
| C18URA | 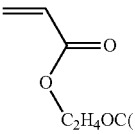 |
| StA | Stearyl acrylate |

| Abbreviation | Compound name |
|---|---|
| C18SBU | 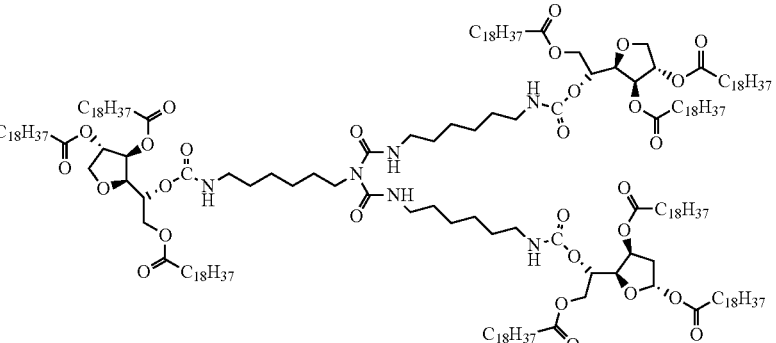 |
| PMMA | Polymethyl methacrylate |

Synthetic Example 1

Synthesis of C18URA (stearyl group-containing urethane acrylate) homopolymer

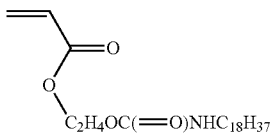

80.2 g of hydroxyethyl acrylate, 100 g of ethyl acetate, 0.03 g of a polymerization inhibitor, and 0.03 g of a tin catalyst were charged into a 1 L four-necked flask. A stirring rod, a thermometer, and a reflux tube were set, and 201.4 g of octadecyl isocyanate was dissolved in 100 g of ethyl acetate and charged into a dropping funnel. The dropping funnel was set in a flask, and the temperature was raised to 70° C. A solution of octadecyl isocyanate in ethyl acetate was gradually dropped from the dropping funnel over about 30 minutes, while paying attention to heat generation. After completion of the dropping, the reaction was carried out for about another 2 hours. It was confirmed by infrared spectroscopy (IR) that the isocyanate peak had disappeared, and the reaction was terminated. The reaction product was reprecipitated in methanol, washed with methanol, and dried under reduced pressure to obtain a white powder. The reaction product was identified as C18URA by $^1$H-NMR.

The melting point of the compound was about 73° C. as determined using a differential scanning calorimeter (DSC).

375 g of toluene, 100 g of C18URA, and 2.5 g of AIBN were charged into a 1 L two-necked flask, nitrogen bubbling was carried out for 15 minutes or more, and then nitrogen was allowed to flow. The temperature was raised to 80° C. in an oil bath, and the mixture was heated and stirred for 4 hours. The consumption of the monomer was confirmed by NMR, and then the heating was stopped.

Chloroform was added to the reaction solution to dissolve the precipitated polymer, and then reprecipitation was carried out twice using methanol for purification to produce a C18URA (stearyl group-containing urethane acrylate) homopolymer.

Synthetic Example 2

Synthesis of PStA (polystearyl acrylate)1

375 g of toluene, 100 g of StA, and 2.5 g of AIBN were charged into a 1 L two-necked flask, nitrogen bubbling was carried out for 15 minutes or more, and then nitrogen was allowed to flow. The temperature was raised to 80° C. in an oil bath, and the mixture was heated and stirred for 4 hours. The consumption of the monomer was confirmed by NMR, and then the heating was stopped. Chloroform was added to the reaction solution to dissolve the precipitated polymer, and then reprecipitation was carried out twice using methanol for purification to produce PStA (polystearyl acrylate).

Synthetic Example 3

Synthesis of C18SBU 100 g of sorbitan tristearate and 120 g of dehydrated 4-methyl-2-pentanone were charged into a 500-ml four-necked flask, hexamethylene diisocyanate (0.33 molar equivalents based on sorbitan tristearate), and subsequently dibutyltin dilaurate (0.0033 molar equivalents based on sorbitan tristearate) was added, and the solution was heated to 50° C. for 1 hour. The solvent was removed, and then the residue was washed with methanol to obtain a reaction product of sorbitan tristearate and hexamethylene diisocyanate. It was confirmed by IR and NMR that the hydroxyl groups of sorbitan tristearate had almost disappeared. In addition, when GPC analysis was carried out before and after the reaction, the molecular weight indicated by the peak position was almost tripled, and a long-chain alkyl group-containing water-repellent resin (C18SBU) having about 9 stearyl groups in the molecule was obtained.

Synthetic Example 4

Synthesis of PMMA (polymethyl methacrylate)

375 g of toluene, 100 g of MMA, and 2.5 g of AIBN were charged into a 1 L two-necked flask, nitrogen bubbling was carried out for 15 minutes or more, and then nitrogen was allowed to flow. The temperature was raised to 80° C. in an oil bath, and the mixture was heated and stirred for 4 hours. The consumption of the monomer was confirmed by NMR, and then the heating was stopped. Chloroform was added to the reaction solution to dissolve the precipitated polymer, and then reprecipitation was carried out twice using methanol for purification to produce PMMA (polymethyl methacrylate).

Example 1

A silica powder surface-treated to have a trimethylsilyl group was provided. The silica powder had an average primary particle diameter of 7 nm, a specific surface area of 250 m²/g, a carbon content of 3% by weight, and an apparent specific gravity of 60 g/L. The trimethylsilyl group was introduced using 1,1,1,3,3,3-hexamethyldisilazane as a water-repellency imparting agent. The degree of treatment, D, determined from elemental analysis was 60%. The number of surface alkyl groups, X, of the water-repellent particle was $1,365 \times 10^{18}$ per 1 g of the water-repellent particle. In addition, the hydrophobicity rate was 30%.

The silica powder (water-repellent particle) was dispersed in toluene to prepare a toluene dispersion (particle concentration of 1.5% by weight).

From the C18URA homopolymer (water-repellent resin) obtained in Synthesis Example 1, a toluene solution of the C18URA homopolymer (resin concentration of 1.5% by weight) was prepared.

The dispersion of the water-repellent particle and the solution of the water-repellent resin were mixed at a weight ratio of 1:1 to produce Treatment liquid 1. Treatment liquid 1 contained the water-repellent particle in an amount of 0.75% by weight and the water-repellent resin in an amount of 0.75% by weight.

Example 2

Treatment liquid 2 was produced by repeating the same procedure as in Example 1 except that a silicone wax (dimethyl silicone, melting point of 37° C.) was added in an amount of 10% by weight based on the water-repellent resin to Treatment liquid 1 obtained in Example 1.

Example 3

Treatment liquid 3 was produced by repeating the same procedure as in Example 1 except that PStA obtained in Synthesis Example 2 was used instead of the C18URA homopolymer.

Example 4

A silica powder surface-treated to have a trimethylsilyl group was provided. The silica powder had an average primary particle diameter of 7 nm, a specific surface area of 210 m²/g, a carbon content of 5% by weight, and an apparent specific gravity of 50 g/L. The trimethylsilyl group was introduced using 1,1,1,3,3,3-hexamethyldisilazane as a water-repellency imparting agent. The degree of treatment, D, determined from elemental analysis was almost 100%. The number of surface alkyl groups of the water-repellent particle was $1,575 \times 10^{18}$ per 1 g of the water-repellent particle, and the hydrophobicity rate was 98%.

The silica powder (water-repellent particle) was dispersed in toluene to prepare a toluene dispersion (particle concentration of 1.5% by weight).

A toluene solution of PStA (resin concentration of 1.5% by weight) was prepared from PStA (water-repellent resin) obtained in Synthesis Example 2.

The dispersion of the water-repellent particle and the solution of the water-repellent resin were mixed at a weight ratio of 1:1 to produce Treatment liquid 4.

Treatment liquid 4 contained the water-repellent particle in an amount of 0.75% by weight and the water-repellent resin in an amount of 0.75% by weight.

Example 5

A silica powder surface-treated to have a trimethylsilyl group was provided. The silica powder had an average primary particle diameter of 12 nm, a specific surface area of 150 m²/g, a carbon content of 6.5% by weight, and an apparent specific gravity of 60 g/L. The trimethylsilyl group was introduced using 1,1,1,3,3,3-hexamethyldisilazane as a water-repellency imparting agent. The degree of treatment, D, determined from elemental analysis was almost 70%. The number of surface alkyl groups of the water-repellent particle was $1,000 \times 10^{18}$ per 1 g of the water-repellent particle, and the hydrophobicity rate was 30%.

Treatment liquid 5 was produced using PStA as the water-repellent resin in the same manner as in Example 4. Treatment liquid 5 contained the water-repellent particle in an amount of 0.75% by weight and the water-repellent resin in an amount of 0.75% by weight.

Example 6

Treatment liquid 6 was produced by repeating the same procedure as in Example 1 except that C18SBU obtained in Synthesis Example 3 was used instead of the C18URA homopolymer, and adding a silicone wax (alkyl-modified dimethyl silicone, melting point of 37° C.) in an amount of 10% by weight based on the water-repellent resin to the prepared Treatment liquid.

Example 7

Treatment liquid 7 was produced by repeating the same procedure as in Example 5 except that C18SBU obtained in Synthesis Example 3 was used instead of the PStA.

Example 8

Treatment liquid 8 was produced by repeating the same procedure as in Example 1 except that PStA obtained in Synthesis Example 2 was used instead of the C18URA homopolymer and the dispersion of the water-repellent particle and the solution of the water-repellent resin were mixed at a weight ratio of 20:80. Treatment liquid 8 contained the water-repellent particle in an amount of 0.3% by weight and the water-repellent resin in an amount of 1.2%.

Example 9

Treatment liquid 9 was produced by repeating the same procedure as in Example 1 except that PStA obtained in Synthesis Example 2 was used instead of the C18URA homopolymer and the dispersion of the water-repellent particle and the solution of the water-repellent resin were mixed at a weight ratio of 40:60. Treatment liquid 9 contained the water-repellent particle in an amount of 0.6% by weight and the water-repellent resin in an amount of 0.9%.

Example 10

Treatment liquid 10 was produced by repeating the same procedure as in Example 1 except that PStA obtained in Synthesis Example 2 was used instead of the C18URA homopolymer and the dispersion of the water-repellent particle and the solution of the water-repellent resin were mixed at a weight ratio of 60:40. Treatment liquid 10 contained the water-repellent particle in an amount of 0.9% by weight and the water-repellent resin in an amount of 0.6%.

Example 11

Treatment liquid 11 was produced by repeating the same procedure as in Example 1 except that PStA obtained in Synthesis Example 2 was used instead of the C18URA homopolymer and the dispersion of the water-repellent particle and the solution of the water-repellent resin were mixed at a weight ratio of 80:20. Treatment liquid 11 contained the water-repellent particle in an amount of 1.2% by weight and the water-repellent resin in an amount of 0.3%.

Comparative Example 1

A silica powder surface-treated with alkylsilane was provided. The silica powder had an average primary particle diameter of 5,900 nm, a specific surface area of 3.6 $m^2$/g, a carbon content of 0.2% by weight, and an apparent specific gravity of 880 g/L. The number of surface alkyl groups of the water-repellent particle was $9\times10^{18}$ per 1 g of the water-repellent particle, and the hydrophobicity rate was 0%.

Treatment liquid C1 was produced by repeating the same procedure as in Example 1 except that this silica powder was used.

Comparative Example 2

Treatment liquid C2 was produced by repeating the same procedure as in Example 1 except that a silicone wax (dimethyl silicone, melting point of 37° C.) was added in an amount of 10% by weight based on the water-repellent resin to Treatment liquid C1 obtained in Comparative Example 1.

Comparative Example 3

A silica powder surface-treated with alkylsilane was provided. The silica powder had an average primary particle diameter of 2,000 nm, a specific surface area of 15 $m^2$/g, a carbon content of 0.2% by weight, and an apparent specific gravity of 920 g/L. The number of surface alkyl groups of the water-repellent particle was $40\times10^{18}$ per 1 g of the water-repellent particle, and the hydrophobicity rate was 0%.

Treatment liquid C3 was produced by repeating the same procedure as in Example 1 except that this silica powder was used.

Comparative Example 4

A silica powder surface-treated to have a dimethylsilyl group was provided. The silica powder had an average primary particle diameter of 7 nm, a specific surface area of 250 $m^2$/g, a carbon content of 2.2% by weight, and an apparent specific gravity of 50 g/L. The dimethylsilyl group was introduced using 1,1,1,3,3,3-dimethyldimethoxysilyl as a water-repellency imparting agent. The degree of treatment, D, determined from elemental analysis was 85%. The number of surface alkyl groups of the water-repellent particle was $531\times10^{18}$. In addition, the hydrophobicity rate could not be measured because the powder was completely compatible with water. The hydrophobicity rate value was 0.

The silica powder was dispersed in toluene to prepare a toluene dispersion (particle concentration of 1.5% by weight).

A toluene solution of PStA (resin concentration of 1.5% by weight) was prepared from PStA (water-repellent resin) obtained in Synthesis Example 2.

The dispersion of the silica powder and the solution of the water-repellent resin were mixed at a weight ratio of 1:1 to produce Treatment liquid C4. Treatment liquid C4 contained the silica powder in an amount of 0.75% by weight and the water-repellent resin in an amount of 0.75% by weight.

Comparative Example 5

A silica powder surface-treated such that the trimethylsilyl group and the amino group had a ratio of 1:1 was provided. The silica powder had an average primary particle diameter of 30 nm, a specific surface area of 40 $m^2$/g, a carbon content of 2% by weight, and an apparent specific gravity of 50 g/L. The amino group was introduced using 3-aminopropyltriethoxysilane, and then the trimethylsilyl group was introduced using 1,1,1,3,3,3-hexamethyldisilazane. The ratio of the amino group to the trimethylsilyl group and the overall degree of treatment were determined from elemental analysis at each synthetic stage. The final degree of treatment, D, was almost 100%. The number of surface alkyl groups of the water-repellent particle was $75\times10^{18}$. In addition, the hydrophobicity rate could not be measured because the powder was completely compatible with water. The hydrophobicity rate value was 0.

Treatment liquid C5 was produced using PStA as the water-repellent resin in the same manner as in Comparative Example 4. Treatment liquid C5 contained the silica powder in an amount of 0.75% by weight and the water-repellent resin in an amount of 0.75% by weight.

Comparative Example 6

Treatment liquid C6 was produced by repeating the same procedure as in Example 1 except that PMMA obtained in Synthesis Example 4 was used instead of the C18URA homopolymer.

Comparative Example 7

A 1.5% by weight toluene solution of PStA obtained in Synthesis Example 2 (Treatment liquid C7) was produced without using a water-repellent particle.

Comparative Example 8

A silica powder surface-treated to have a dimethylsilyl group was provided. The silica powder had an average primary particle diameter of 12 nm, a specific surface area of 170 $m^2$/g, a carbon content of 1.1% by weight, and an apparent specific gravity of 50 g/L. The dimethylsilyl group was introduced using 1,1,1,3,3,3-dimethyldimethoxysilyl as a water-repellency imparting agent. The degree of treatment, D, determined from elemental analysis was 85%. The number of surface alkyl groups of the water-repellent particle was $531\times10^{18}$.

The silica powder was dispersed in toluene to prepare a toluene dispersion (particle concentration of 1.5% by weight).

A toluene solution of PStA (resin concentration of 1.35% by weight) was prepared from PStA (water-repellent resin) obtained in Synthesis Example 2.

The dispersion of the silica powder and the solution of the water-repellent resin were mixed at a weight ratio of 1:9 to produce Treatment liquid C8. Treatment liquid C8 contained the silica powder in an amount of 0.15% by weight and the water-repellent resin in an amount of 1.35% by weight.

Test Example 1

Treatment liquid 1 was applied to a polyester fabric (beige) by a drop casting method and passed through a mangle. This treated fabric was passed through a pin tenter at 170° C. for 3 minutes, dried, and cured.

The treated fabric was subjected to the strong water-repellency test, the spray water-repellency test, and the Bundesmann water repellency test. Results are shown in Table 1.

Test Example 2

The same procedure as in Test Example 1 was repeated except that Treatment liquid 2 of Example 2 was used.
Results are shown in Table 1.

Test Example 3

The same procedure as in Test Example 1 was repeated except that Treatment liquid 3 of Example 3 was used and the dip coating method was used instead of the drop casting method. Results are shown in Table 1.

Test Example 4

The same procedure as in Test Example 1 was repeated except that Treatment liquid 3 of Example 3 was used and the Treatment liquid was ultrasonically treated (for 10 minutes using an ultrasonic irradiator under an ultrasonic treatment condition of 250 W). Results are shown in Table 1.

Test Example 5

The same procedure as in Test Example 3 was repeated except that Treatment liquid 4 of Example 4 was used. Results are shown in Table 2.

Test Examples 6 to 12

The same procedure as in Test Example 1 was repeated except that Treatment liquid 5 of Example 5 (Test Example 6), Treatment liquid 6 of Example 6 (Test Example 7), Treatment liquid 7 of Example 7 (Test Example 8), Treatment liquid 8 of Example 8 (Test Example 9), Treatment liquid 9 of Example 9 (Test Example 10), Treatment liquid 10 of Example 10 (Test Example 11), or Treatment liquid 11 of Example 11 (Test Example 12) was used. Results are shown in Table 2.

Comparative Test Examples 1 to 3

The same procedure as in Test Example 1 was repeated except that Treatment liquid C1 of Comparative Example 1 (Comparative Test Example 1), Treatment liquid C2 of Comparative Example 2 (Comparative Test Example 2), and Treatment liquid C3 of Comparative Example 3 (Comparative Test Example 3) were used. Results are shown in Table 3.

Comparative Test Examples 4 to 8

The same procedure as in Test Example 1 was repeated except that Treatment liquid C4 of Comparative Example 4 (Comparative Test Example 4), Treatment liquid C5 of Comparative Example 5 (Comparative Test Example 5), Treatment liquid C6 of Comparative Example 6 (Comparative Test Example 6), Treatment liquid C7 of Comparative Example 7 (Comparative Test Example 7), and Treatment liquid C8 of Comparative Example 8 (Comparative Test Example 8) were used. Results are shown in Table 4.

TABLE 1

| | | Test Example 1 (Example 1) | Test Example 2 (Example 2) | Test Example 3 (Example 3) | Test Example 4 (Example 3) |
|---|---|---|---|---|---|
| | Treatment liquid | Treatment liquid 1 | Treatment liquid 2 | Treatment liquid 3 | Treatment liquid 3 |
| Particle | Particle diameter | 7 nm | 7 nm | 7 nm | 7 nm |
| | Hydrophobicity rate (%) | 30 | 30 | 30 | 30 |
| | M value | 50 | 50 | 50 | 50 |
| | Number of surface alkyl groups ($10^{18}$) | 1365 | 1365 | 1365 | 1365 |
| | Concentration (%) | 0.75 | 0.75 | 0.75 | 0.75 |
| Resin | Type | C18URA | C18URA | PStA | PStA |
| | Concentration (%) | 0.75 | 0.75 | 0.75 | 0.75 |
| Additive | Silicone wax | None | Yes | None | None |
| Solvent | Solvent | Toluene | Toluene | Toluene | Toluene |
| | Solid concentration | 1.5 | 1.5 | 1.5 | 1.5 |
| Others | Particle:Resin | 1:1 | 1:1 | 1:1 | 1:1 |
| | Coating Method | Drop | Drop | Dip | Drop |
| | Sliding speed (mm/sec) | 329 | 331 | 314 | 285 |
| | Contact angle | 170 | 168 | 156 | 155 |
| | Sliding angle | 2.5 | 2.0 | 12.7 | 3.3 |

TABLE 1-continued

|  |  | Test Example 1 (Example 1) | Test Example 2 (Example 2) | Test Example 3 (Example 3) | Test Example 4 (Example 3) |
|---|---|---|---|---|---|
| Surface state of fiber | Aggregate | Very Good | Very Good | Very Good | Very Good |
|  | Surface coverage | Very Good | Very Good | Very Good | Very Good |
| Evaluation | Strong water-repellency | Good+ | Good+ | Good+ | Good+ |
|  | Spray water-repellency | 100 | 100 | 100 | 100 |
|  | Bundesmann | 100 | 100 | 90 | 100 |

|  |  | Test Ex. 5 Ex. 4 | Test Ex. 6 Ex. 5 | Test Ex. 7 Ex. 6 | Test Ex. 8 Ex. 7 | Test Ex. 9 Ex. 8 | Test Ex. 10 Ex. 9 | Test Ex. 11 Ex. 10 | Test Ex. 12 Ex. 11 |
|---|---|---|---|---|---|---|---|---|---|
| Treatment liquid |  | Treatment liquid 4 | Treatment liquid 5 | Treatment liquid 6 | Treatment liquid 7 | Treatment liquid 8 | Treatment liquid 9 | Treatment liquid 10 | Treatment liquid 11 |
| Particle | Particle diameter | 7 nm | 12 nm | 7 nm | 12 nm | 7 nm | 7 nm | 7 nm | 7 nm |
|  | Hydrophobicity rate (%) | 98 | 70 | 30 | 70 | 30 | 30 | 30 | 30 |
|  | M value | 63 | 50 | 50 | 50 | 50 | 50 | 50 | 50 |
|  | Number of surface alkyl groups ($10^{18}$) | 575 | 1000 | 1365 | 1000 | 1365 | 1365 | 1365 | 1365 |
|  | Concentration (%) | 0.75 | 0.75 | 0.75 | 0.75 | 0.3 | 0.6 | 0.9 | 1.2 |
| Resin | Type | PStA | PStA | C18SBU | C18SBU | PStA | PStA | PStA | PStA |
|  | Concentration (%) | 0.75 | 0.75 | 0.75 | 0.75 | 1.2 | 0.9 | 0.6 | 0.3 |
| Additive | Silicone wax | None | None | None | None | None | None | None | None |
| Solvent | Solvent | Toluene | Toluene | Toluene | Toluene | Toluene | Toluene | Toluene | Toluene |
|  | Solid concentration | 1.5 | 1.5 | 1.5 | 1.5 | 1.5 | 1.5 | 1.5 | 1.5 |
| Others | Particle:Resin | 1:1 | 1:1 | 1:1 | 1:1 | 2:8 | 4:6 | 6:4 | 8:2 |
|  | Coating Method | Dip | Drop | Drop | Drop | Drop | Drop | Drop | Drop |
|  | Sliding speed (mm/sec) | 333 | 343 | 319 | 315 | 285 | 341 | 345 | 328 |
|  | Contact angle | 159 | 157 | 157 | 155 | 154 | 157 | 158 | 157 |
|  | Sliding angle | 20 | 3.7 | 10.3 | 12.1 | 13.0 | 5.5 | 4.0 | 6.7 |
| Surface state of fiber | Aggregate | Very Good | Very Good | Very Good | Very Good | Very Good | Very Good | Very Good | Very Good |
|  | Surface coverage | Good | Very Good | Very Good | Very Good | Very Good | Very Good | Very Good | Very Good |
| Evaluation | Strong water-repellency | Good | Good | Good− | Good− | Good− | Good+ | Good+ | Good |
|  | Spray water-repellency | 100 | 100 | 100 | 100 | 90 | 100 | 100 | 95 |
|  | Bundesmann | — | — | — | — | — | 100 | 100 | — |

TABLE 3

|  |  | Com. Test Ex. 1 (Com. Ex. 1) | Com. Test Ex. 2 (Com. Ex. 2) | Com. Test Ex. 3 (Com. Ex. 3) |
|---|---|---|---|---|
| Treatment liquid |  | Treatment liquid C1 | Treatment liquid C2 | Treatment liquid C3 |
| Particle | Particle diameter | 5000 nm | 5000 nm | 2000 nm |
|  | Hydrophobicity rate (%) | 0 | 0 | 0 |
|  | M value | 0 | 0 | 0 |
|  | Number of surface alkyl groups ($10^{18}$) | 9 | 9 | 40 |
|  | Concentration (%) | 0.75 | 0.75 | 0.75 |
| Resin | Type | C18URA | C18URA | C18URA |
|  | Concentration (%) | 0.75 | 0.75 | 0.75 |
| Additive | Silicone wax | None | Yes | None |
| Solvent | Solvent | Toluene | Toluene | Toluene |
|  | Solid concentration | 1.5 | 1.5 | 1.5 |

TABLE 3-continued

|  |  | Com. Test Ex. 1 (Com. Ex. 1) | Com. Test Ex. 2 (Com. Ex. 2) | Com. Test Ex. 3 (Com. Ex. 3) |
|---|---|---|---|---|
| Others | Particle:Resin | 1:1 | 1:1 | 1:1 |
|  | Coating Method | Drop | Drop | Drop |
|  | Sliding speed (mm/sec) | 197 | 193 | 221 |
|  | Contact angle | 152 | 156 | 151 |
|  | Sliding angle | 21.3 | 25.0 | 19.7 |
| Surface state of fiber | Aggregate | Very Good | Very Good | Very Good |
|  | Surface coverage | Bad | Bad | Bad |
| Evaluation | Strong water-repellency | Bad | Bad | Bad |
|  | Spray water-repellency | 80 | 80 | 80 |
|  | Bundesmann | 50 | 50 | 50 |

TABLE 4

|  |  | Com. Test Ex. 4 Com. Ex. 4 | Com. Test Ex. 5 Com. Ex. 5 | Com. Test Ex. 6 Com. Ex. 6 | Com. Test Ex. 7 Com. Ex. 7 | Com. Test Ex. 8 Com. Ex. 8 |
|---|---|---|---|---|---|---|
| Treatment liquid |  | Treatment liquid C4 | Treatment liquid C5 | Treatment liquid C6 | Treatment liquid C7 | Treatment liquid C8 |
| Particle | Particle diameter | 7 nm | 30 nm | 7 nm | — | 12 nm |
|  | Hydrophobicity rate (%) | 0 | 0 | 30 | — | — |
|  | M value | 40 | 53 | 50 | — | 39 |
|  | Number of surface alkyl groups ($10^{18}$) | 531 | 75 | 1365 | — | 361 |
|  | Concentration (%) | 0.75 | 0.75 | 0.75 | — | 0.15 |
| Resin | Type | PStA | PStA | PMMA | PStA | PStA |
|  | Concentration (%) | 0.75 | 0.75 | 0.75 | 1.5 | 1.35 |
| Additive | Silicone wax | None | None | None | None | None |
| Solvent | Solvent | Toluene | Toluene | Toluene | Toluene | Toluene |
|  | Solid concentration | 1.5 | 1.5 | 1.5 | 1.5 | 1.5 |
| Others | Particle:Resin | 1:1 | 1:1 | 1:1 | — | 1:9 |
|  | Coating method | Drop | Drop | Drop | Dip | Drop |
|  | Sliding speed (mm/sec) | 285 | 207 | No sliding | No sliding | 210 |
|  | Contact angle | 154 | 150 | 142 | 132 | 160 |
|  | Sliding angle | 11 | 34 | 32 | 40 | 23 |
| Surface state of fiber | Aggregate | Bad | Very Good | Very Good | — | Very Good |
|  | Surface coverage | Very Good | Fair | Very Good | — | Very Good |
| Evaluation | Strong water-repellency | Fair | Fair | Bad | Fair | Fair |
|  | Spray water-repellency | 80 | 90 | 50 | 100 | 100 |
|  | Bundesmann | — | — | 0 | 50 | — |

Industrial Applicability

The water-repellent composition can be used as a surface treatment agent which imparts high water-repellency to a substrate, particularly a textile product.

What is claimed is:

1. A water-repellent composition comprising:
   (A) a water-repellent particle in which the number of surface alkyl groups of the water-repellent particle is $600 \times 10^{18}$ to $50,000 \times 10^{18}$ per 1 g of the water-repellent particle;
   (B) a water-repellent resin which is a polymer having a long-chain hydrocarbon group having 7 to 40 carbon atoms; and
   (C) a liquid medium,
   wherein the amount of the water-repellent particle is 20 to 90% by weight based on the total weight of the water-repellent particle and the water-repellent resin.

2. The water-repellent composition according to claim 1, wherein the water-repellent particle is a particle having a hydrophobicity rate of 20% or more.

3. The water-repellent composition according to claim 1, wherein the number of surface alkyl groups of the water-repellent particle is $1,000 \times 10^{18}$ to $10,000 \times 10^{18}$ per 1 g of the water-repellent particle.

4. The water-repellent composition according to claim 1, wherein the water-repellent particle is at least one inorganic particle selected from hydrophobic silica obtained by treating silica with a hydrophobizing agent and hydrophobic alumina obtained by treating alumina with a hydrophobizing agent, or a hydrophobic organic particle.

5. The water-repellent composition according to claim 1, wherein an average primary particle diameter of the water-repellent particle is 1 to 100 nm.

6. The water-repellent composition according to claim 1, wherein, in the water-repellent resin, the long-chain hydrocarbon group having 7 to 40 carbon atoms is a stearyl group, an icosyl group, or a behenyl group.

7. The water-repellent composition according to claim 6, wherein the polymer having a long-chain hydrocarbon group having 7 to 40 carbon atoms has a repeating unit formed from an acrylic monomer having a long-chain hydrocarbon group having 7 to 40 carbon atoms, and the acrylic monomer having a long-chain hydrocarbon group is a monomer represented by the formula:

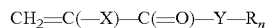

$CH_2=C(-X)-C(=O)-Y-R_n$ wherein X is a hydrogen atom, a methyl group, or a halogen atom other than a fluorine atom, Y is a group (other than a hydrocarbon group) composed of at least one or more selected from a divalent or trivalent hydrocarbon group having 1 carbon atom, $-C_6H_6-$, $-O-$, $-C(=O)-$, $-S(C=O)_2-$, or $-NH-$, R is a hydrocarbon group having 7 to 40 carbon atoms, and n is an integer of 1 to 3.

8. The water-repellent composition according to claim 6, wherein X is a hydrogen atom, a methyl group, or a chlorine atom, in the acrylic monomer having a long-chain hydrocarbon group.

9. The water-repellent composition according to claim 1, wherein a weight ratio of the water-repellent particle to the water-repellent resin is 25:75 to 90:10, and a total amount of (A) the water-repellent particle and (B) the water-repellent resin is 0.5 to 50% by weight based on the water-repellent composition.

10. The water-repellent composition according to claim 1, wherein the liquid medium is an organic solvent and/or water.

11. The water-repellent composition according to claim 1, wherein the water-repellent composition does not contain a fluorine atom.

12. The water-repellent composition according to claim 1, wherein the water-repellent composition is for a textile product.

13. A method for treating a fiber, comprising treating a fiber with a treatment liquid comprising the water-repellent composition according to claim 1.

14. A method for producing a treated textile product, comprising treating a fiber by the method according to claim 13.

15. A film formed from the water-repellent composition according to claim 1.

16. A textile product treated with a treatment liquid comprising the water-repellent composition according to claim 1.

17. A textile product having a surface to which the water-repellent particle and the water-repellent resin in the water-repellent composition according to claim 1.

18. A textile product treated with a treatment liquid comprising the water-repellent composition according to claim 1, wherein the textile product has a water sliding speed of 300 mm/sec or more, wherein the water-repellent particle and the water-repellent resin which are adhered to a surface of the textile product cover a fiber surface by 80% or more without substantially aggregating with a size of 10 μm or more.

19. A textile product treated with a fluorine-free water-repellent agent and having a water sliding speed of 300 mm/sec or more.

* * * * *